(12) United States Patent
Ochi

(10) Patent No.: US 9,081,506 B2
(45) Date of Patent: Jul. 14, 2015

(54) TAPE APPARATUS, STORAGE CONTROL APPARATUS, AND STORAGE CONTROL METHOD

(71) Applicant: FUJITSU LIMITED, Kawasaki-shi, Kanagawa (JP)

(72) Inventor: Yoshiaki Ochi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/504,493

(22) Filed: Oct. 2, 2014

(65) Prior Publication Data

US 2015/0116857 A1 Apr. 30, 2015

(30) Foreign Application Priority Data

Oct. 30, 2013 (JP) ................................. 2013-225165

(51) Int. Cl.
G11B 5/86 (2006.01)
G06F 3/06 (2006.01)
G11B 5/008 (2006.01)

(52) U.S. Cl.
CPC .............. *G06F 3/0619* (2013.01); *G06F 3/065* (2013.01); *G06F 3/0686* (2013.01); *G11B 5/00813* (2013.01)

(58) Field of Classification Search
CPC .... G11B 5/86; G11B 2220/90; G11B 27/024; G11B 15/1875; G11B 15/1808; G11B 27/107; H04N 5/782
USPC ............................................ 360/15, 70, 72.2
See application file for complete search history.

(56) References Cited

U.S. PATENT DOCUMENTS

| 6,662,281 | B2 * | 12/2003 | Ballard et al. ................ 711/162 |
| 6,940,666 | B2 * | 9/2005 | Hanagata et al. ............... 360/15 |
| 7,155,486 | B2 | 12/2006 | Aoshima et al. | |

FOREIGN PATENT DOCUMENTS

| JP | 11-126175 | 5/1999 |
| JP | 2001-209501 | 8/2001 |
| JP | 2004-157637 | 6/2004 |
| JP | 2011-108091 | 6/2011 |

OTHER PUBLICATIONS

Patent Abstracts of Japan, Publication No. 11-126175, published May 11, 1999.
Patent Abstracts of Japan, Publication No. 2001-209501, published Aug. 3, 2001.
Patent Abstracts of Japan, Publication No. 2004-157637, published Jun. 3, 2004.
Patent Abstracts of Japan, Publication No. 2011-108091, published Jun. 2, 2011.

* cited by examiner

*Primary Examiner* — Nabil Hindi
(74) *Attorney, Agent, or Firm* — Staas & Halsey LLP

(57) ABSTRACT

A tape apparatus includes a controller and a plurality of tape drives. The controller controls reading from and writing onto magnetic tapes by the use of the plurality of tape drives. Furthermore, when the controller receives a data write request, the controller writes received data both onto one of main data magnetic tapes and onto an auxiliary data magnetic tape. In addition, each time the controller receives a data write request, the controller writes received data onto a corresponding main data magnetic tape and adds the received data onto a common auxiliary data magnetic tape.

13 Claims, 27 Drawing Sheets

| VOLUME MANAGEMENT TABLE | | | | 52 |
|---|---|---|---|---|

| VOLUME | START LOCATION | LAST LOCATION | STATE |
|---|---|---|---|
| VOL001 | 0 | 99 | ON |
| VOL010 | 100 | 1000 | OFF |
| VOL010 | 1001 | 1549 | ON |
| VOL999 | 1550 | 2589 (last) | ERR |

| ACCESS MANAGEMENT TABLE | | | |
|---|---|---|---|
| VOLUME | WRITE FAILURE LOCATION | REWIND LOCATION | READ FAILURE LOCATION |
| VOL001 | 320 | 456 | NULL |
| VOL010 | NULL | NULL | 1000 |

FIG. 7

TAPE APPARATUS, STORAGE CONTROL APPARATUS, AND STORAGE CONTROL METHOD

CROSS-REFERENCE TO RELATED APPLICATION

This application is based upon and claims the benefit of priority of the prior Japanese Patent Application No. 2013-225165, filed on Oct. 30, 2013, the entire contents of which are incorporated herein by reference.

FIELD

The embodiments discussed herein are related to a tape apparatus, a storage control apparatus, and a storage control method.

BACKGROUND

Magnetic tapes are known as portable record media which have large storage capacity and the costs per storage capacity of which are low. Magnetic tapes are widely used as, for example, backup record media.

A method for backing up data on a main data magnetic tape and backing up on an auxiliary data magnetic tape data which is the same as that saved on the main data magnetic tape is known as one of backup methods using a magnetic tape. By adopting this method, data can be recovered by the use of the auxiliary data magnetic tape even if an abnormality occurs in the main data magnetic tape at the time of data recovery. This reduces the risk of losing backup data. Furthermore, a main data magnetic tape associated with a backup source storage area is used at backup time. As a result, a main data magnetic tape, which is a backup destination, corresponding to a storage area can be managed easily.

In order to back up data on a main data magnetic tape and an auxiliary data magnetic tape, the following techniques are proposed. For example, a technique for recording data outputted from a host apparatus on a magnetic tape at once in parallel is proposed. With this technique, an operation is simplified and time taken to perform backup is reduced.

In addition, another technique is proposed. Data and instructions to write the data are received from a host server. The data is written to a disk array and is written from the disk array to a tape. If the tape or the contents of the data meet a determined condition, then the data is also written to a spare tape. By doing so, data integrity is enhanced by the use of a small number of tapes.

Japanese Laid-open Patent Publication No. 2001-209501
Japanese Laid-open Patent Publication No. 2011-108091

By the way, there are cases where data in storage areas (disk volumes, logical volumes, or the like) is backed up on different magnetic tapes according to storage areas. This makes it easy to manage the backup destination magnetic tapes corresponding to the storage areas.

If data in each storage area is backed up not only on a main data magnetic tape but also on an auxiliary data magnetic tape and the main data magnetic tape and the auxiliary data magnetic tape are associated with each other on a one-to-one basis, the number of magnetic tapes used for backup increases.

SUMMARY

According to an aspect, there is provided a tape apparatus including a plurality of tape drives and a controller which controls reading from and writing onto magnetic tapes by the use of the plurality of tape drives, which writes, at the time of receiving a data write request, received data both onto a main data magnetic tape and onto an auxiliary data magnetic tape, and which writes, each time the controller receives a data write request, received data onto a corresponding main data magnetic tape and adds the received data onto a common auxiliary data magnetic tape.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 indicates an example of a volume management table;

FIG. 7 indicates an example of an access management table;

DESCRIPTION OF EMBODIMENTS

Figure 1:
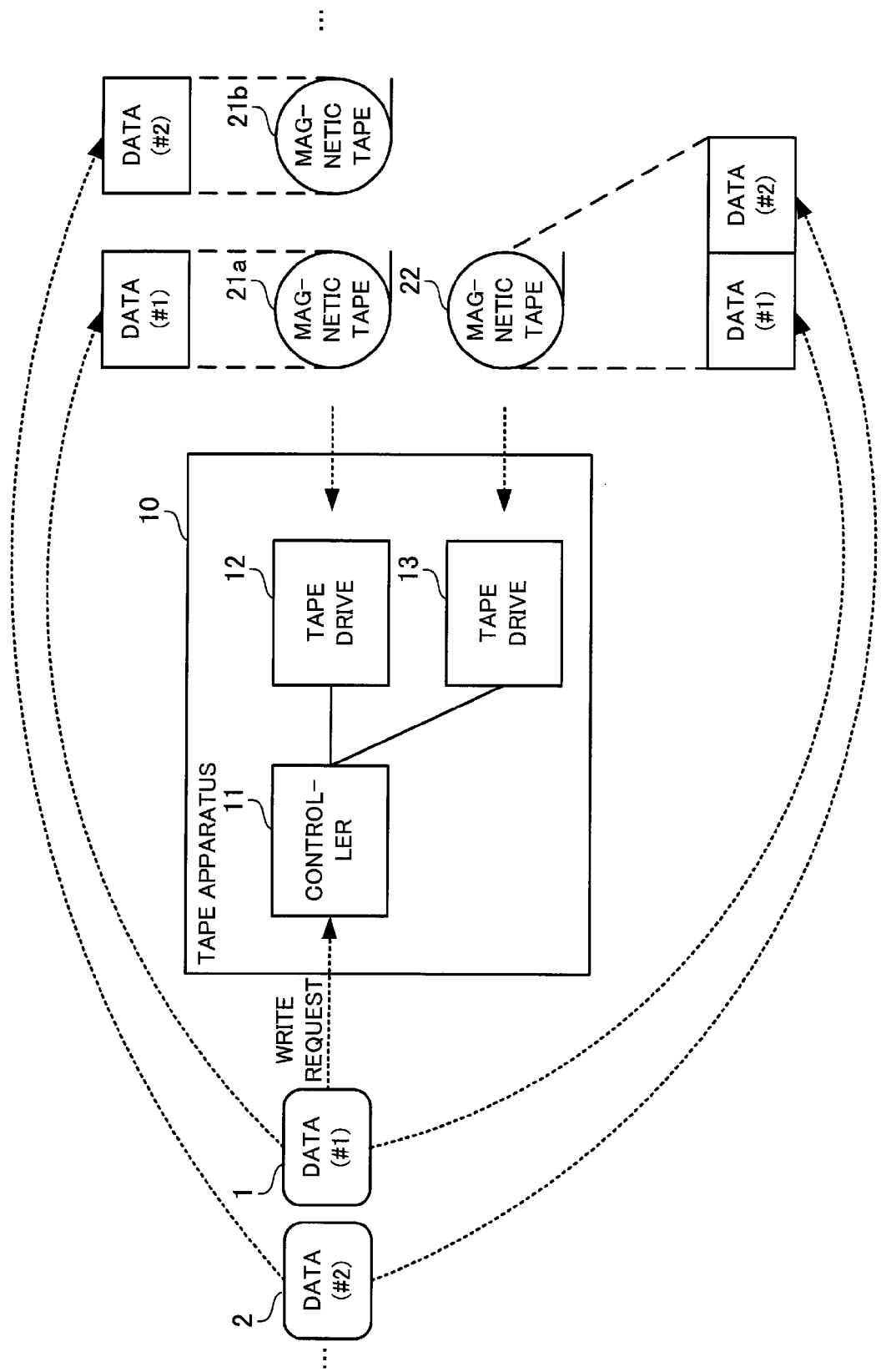
FIG. 1 illustrates an example of the structure of a tape apparatus according to a first embodiment and an example of a process in the first embodiment.

Embodiments will now be described with reference to the accompanying drawings, wherein like reference numerals refer to like elements throughout.

(First Embodiment)

FIG. 1 illustrates an example of the structure of a tape apparatus according to a first embodiment and an example of a process in the first embodiment. A tape apparatus 10 exercises control over the backing up of data onto a magnetic tape. The tape apparatus 10 includes a controller 11 and tape drives 12 and 13.

The controller 11 uses the tape drives 12 and 13 for controlling reading from and writing onto a magnetic tape. Furthermore, when the controller 11 receives a data write request, the controller 11 writes received data both onto a main data magnetic tape and onto an auxiliary data magnetic tape. For example, if data is managed by the volume, then data in a volume is received and written. If data is managed by the segment, data which belongs to a segment is received and written.

A main data magnetic tape is used for storing data. Different main data magnetic tapes are used according to data for which write requests are made. This makes it easy to manage backup data. The auxiliary data magnetic tape is used for storing a duplicate of data on a main data magnetic tape. The auxiliary data magnetic tape is used when a failure occurs in a main data magnetic tape or when a main data magnetic tape gets lost.

In addition, each time the controller 11 receives a data write request, the controller 11 writes received data onto a corresponding main data magnetic tape and adds the received data onto the common auxiliary data magnetic tape. To "add" means writing new data next to data stored in a storage medium.

For example, a magnetic tape 21*a* is mounted on the tape drive 12. The magnetic tape 21*a* is a main data magnetic tape. Furthermore, a magnetic tape 22 is mounted on the tape drive 13. The magnetic tape 22 is an auxiliary data magnetic tape.

At this time it is assumed that the controller 11 receives data 1. An identifier of the data 1 is "#1". In this case, the controller 11 writes the data 1 onto the magnetic tape 21*a* by the use of the tape drive 12 and writes the data 1 onto the magnetic tape 22 by the use of the tape drive 13.

After that, it is assumed that the controller 11 receives data 2 in a state in which a magnetic tape 21*b* is mounted on the tape drive 12. An identifier of the data 2 is "#2". Furthermore, the magnetic tape 21*b* is a main data magnetic tape. In this case, the controller 11 writes the data 2 onto the magnetic tape 21*b* different from the magnetic tape 21*a* by the use of the tape drive 12 and adds the data 2 onto the common magnetic tape 22 by the use of the tape drive 13.

Accordingly, as illustrated in FIG. 1, the magnetic tape 21*a* stores the data 1 and the magnetic tape 21*b* stores the data 2. In addition, the magnetic tape 22 stores the data 1 and the data 2 en bloc which are stored on the magnetic tapes 21*a* and 21*b* respectively.

With the tape apparatus 10 according to the first embodiment, each time the controller 11 receives data, the controller 11 writes the received data onto a corresponding main data magnetic tape and adds the received data onto a common auxiliary data magnetic tape. As a result, plural pieces of data are stored en bloc on one auxiliary data magnetic tape.

It is assumed that different auxiliary data magnetic tapes, as with main data magnetic tapes, are used according to data. This needs auxiliary data magnetic tapes which are equal in number to main data magnetic tapes, and the number of magnetic tapes used for backup increases.

Furthermore, in recent years the capacity of magnetic tapes has increased and there are magnetic tapes onto which 1600-gigabyte data can be written. In many cases, on the other hand, the length of data to be backed up is 2 to 3 gigabytes. Accordingly, if different auxiliary data magnetic tapes are used according to data, free capacity of each auxiliary data magnetic tape onto which data is written is large and a storage area of each auxiliary data magnetic tape is not effectively utilized.

As stated above, plural pieces of data are stored en bloc on one auxiliary data magnetic tape. This makes it possible to reduce the number of magnetic tapes used for backup, while keeping data management easy by main data magnetic tapes. In addition, the capacity of a magnetic tape is effectively utilized.

Furthermore, the tape apparatus 10 writes data received on the basis of one write request onto a main data magnetic tape and an auxiliary data magnetic tape. With a method in which writing onto a main data magnetic tape and an auxiliary data magnetic tape are performed individually, two write requests are made. With the above method, on the other hand, data is written onto a main data magnetic tape and an auxiliary data magnetic tape in response to one write request. As a result, a backup operation is performed efficiently.

(Second Embodiment)

Figure 2:
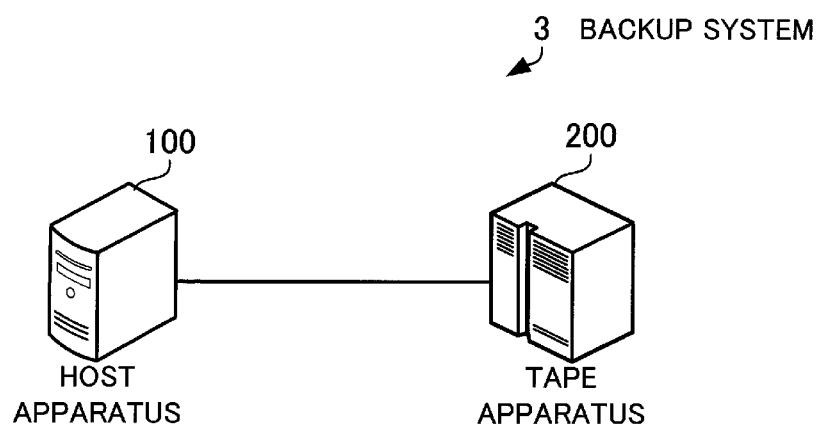
FIG. 2 illustrates an example of a backup system according to a second embodiment.

FIG. 2 illustrates an example of a backup system according to a second embodiment. A backup system 3 includes a host apparatus 100 and a tape apparatus 200. The host apparatus 100 and the tape apparatus 200 are connected via, for example, a network. A plurality of host apparatus 100 may be connected to the tape apparatus 200. The tape apparatus 200 is an example of the tape apparatus 10 according to the first embodiment.

The host apparatus 100 is a computer including a plurality of storage units. The host apparatus 100 designates a backup destination record medium and requests the tape apparatus 200 to back up data in a desired storage area (which may hereinafter be stated as a "volume"). In this system one volume consists of all storage areas in one storage unit. However, one volume may consist of one segment obtained by division on a storage unit. Furthermore, one volume may be a logical volume logically formed in storage areas. The host apparatus 100 designates a restore source record medium and requests the tape apparatus 200 to restore data in a desired storage unit.

As described later, the tape apparatus 200 includes a plurality of tape drives and a controller (tape controller) which exercises control over the reading of data from and the writing of data onto magnetic tapes by the use of these tape drives. The tape apparatus 200 backs up or restores data in response to a request from the host apparatus 100.

In a backup process, the tape apparatus 200 writes data in a volume designated by the host apparatus 100 onto a tape medium (which may hereinafter be stated as a "main medium") designated by the host apparatus 100. At this time the tape apparatus 200 adds this backup data onto another tape medium (which will hereinafter be stated as an "auxiliary medium"). To "add" means writing new data next to data stored on a tape medium. The auxiliary medium is not recognized by the host apparatus 100.

Furthermore, a restore process is the process of reading out data stored on a tape medium to the host apparatus 100. The tape apparatus 200 restores data on a designated main medium in the host apparatus 100 in response to a request from the host apparatus 100. In addition, when the tape apparatus 200 fails in restoring data from a main medium, the tape apparatus 200 acquires the data from the auxiliary medium and performs restoration by the use of the acquired data. Hereinafter a process performed at the time of failing in restoring from a main medium may be stated as "recovery".

The tape apparatus 200 makes a job perform the above backup or restore. Hereinafter a backup process performed by the tape apparatus 200 in response to a request to back up one volume may be stated as a "backup job". Furthermore, a restore process performed by the tape apparatus 200 in response to a request to restore one volume may be stated as a "restore job". The tape apparatus 200 has the function of running more than one backup job in parallel. In addition, the tape apparatus 200 has the function of running a backup job and a restore job in parallel.

Figure 3:
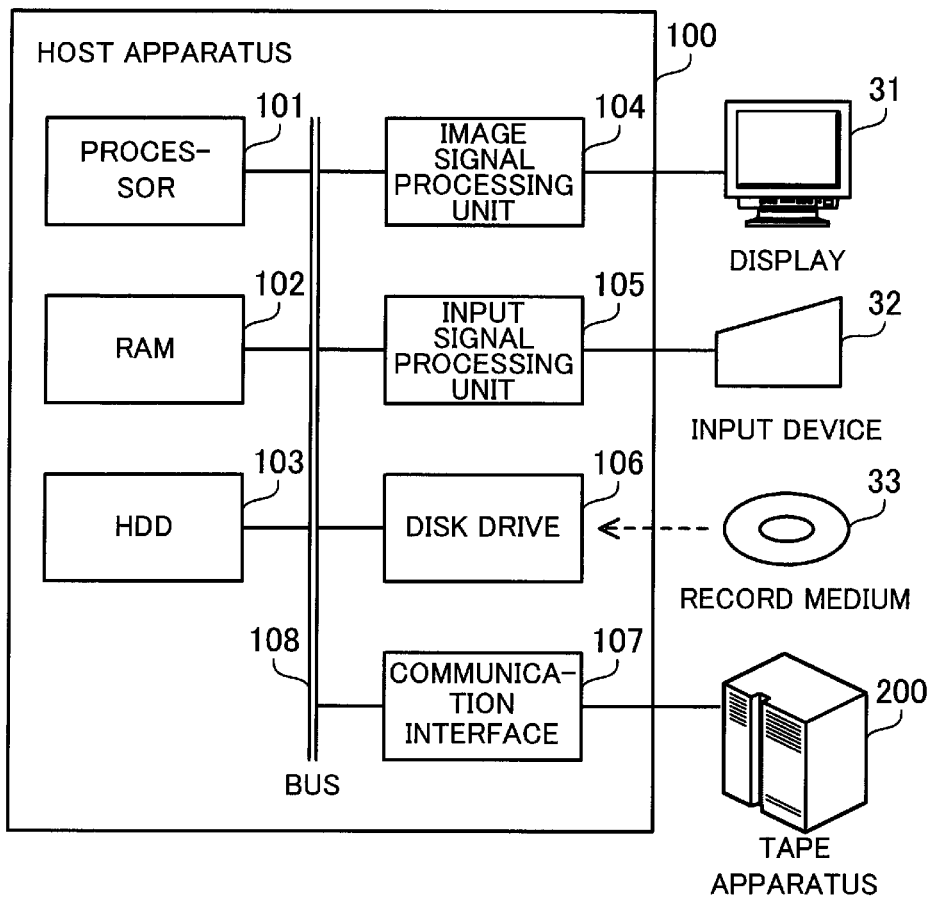
FIG. 3 illustrates an example of the hardware configuration of a host apparatus.

FIG. 3 illustrates an example of the hardware configuration of the host apparatus. The host apparatus 100 includes a processor 101, a RAM (Random Access Memory) 102, a HDD (Hard Disk Drive) 103, an image signal processing unit 104, an input signal processing unit 105, a disk drive 106, and a communication interface 107. These units are connected to a bus 108 in the host apparatus 100.

The processor 101 includes an operation unit which executes a program instruction, and is, for example, a CPU (Central Processing Unit). The processor 101 loads into the RAM 102 at least a part of a program or data stored in the HDD 103, and executes the program. The processor 101 may include a plurality of processor cores. Furthermore, the host apparatus 100 may include a plurality of processors. Moreover, the host apparatus 100 may perform parallel processing by the use of a plurality of processors or processor cores. In addition, a set of two or more processors, a dedicated circuit such as a FPGA (Field Programmable Gate Array) or an ASIC (Application Specific Integrated Circuit), a set of two or more dedicated circuits, a combination of a processor and a dedicated circuit, or the like may be referred to as a "processor".

The RAM 102 is a volatile memory which temporarily stores a program executed by the processor 101 or data referred to by the program. The host apparatus 100 may include a memory which differs from a RAM in type, or include a plurality of volatile memories.

The HDD 103 is a nonvolatile storage unit which stores software, such as an OS (Operating System), firmware, and application programs, and data. The host apparatus 100 may include a storage unit, such as a flash memory, which differs from a HDD in type, or include a plurality of nonvolatile storage units.

In accordance with an instruction from the processor 101, the image signal processing section 104 outputs an image to a display 31 connected to the host apparatus 100. A CRT (Cathode Ray Tube) display, a liquid crystal display, or the like is used as the display 31.

The input signal processing section 105 acquires an input signal from an input device 32 connected to the host apparatus 100, and outputs it to the processor 101. A pointing device, such as a mouse or a touch panel, a keyboard, or the like is used as the input device 32.

The disk drive 106 is a drive unit which reads a program or data recorded on a record medium 33. A magnetic disk, such as a FD (Flexible Disk) or a HDD, an optical disk, such as a CD (Compact Disc) or a DVD (Digital Versatile Disc), a MO (Magneto-Optical disk), or the like is used as the record medium 33. The disk drive 106 stores a program or data which it reads from the record medium 33 in the RAM 102 or the HDD 103 in accordance with an instruction from the processor 101.

The communication interface 107 communicates with another information processing apparatus (tape apparatus 200, for example).

The host apparatus 100 may not include the disk drive 106. If the host apparatus 100 is controlled exclusively by another terminal apparatus, then the host apparatus 100 may not include the image signal processing unit 104 or the input signal processing unit 105. Furthermore, the display 31 or the input device 32 and an enclosure of the host apparatus 100 may be formed integrally.

Figure 4:
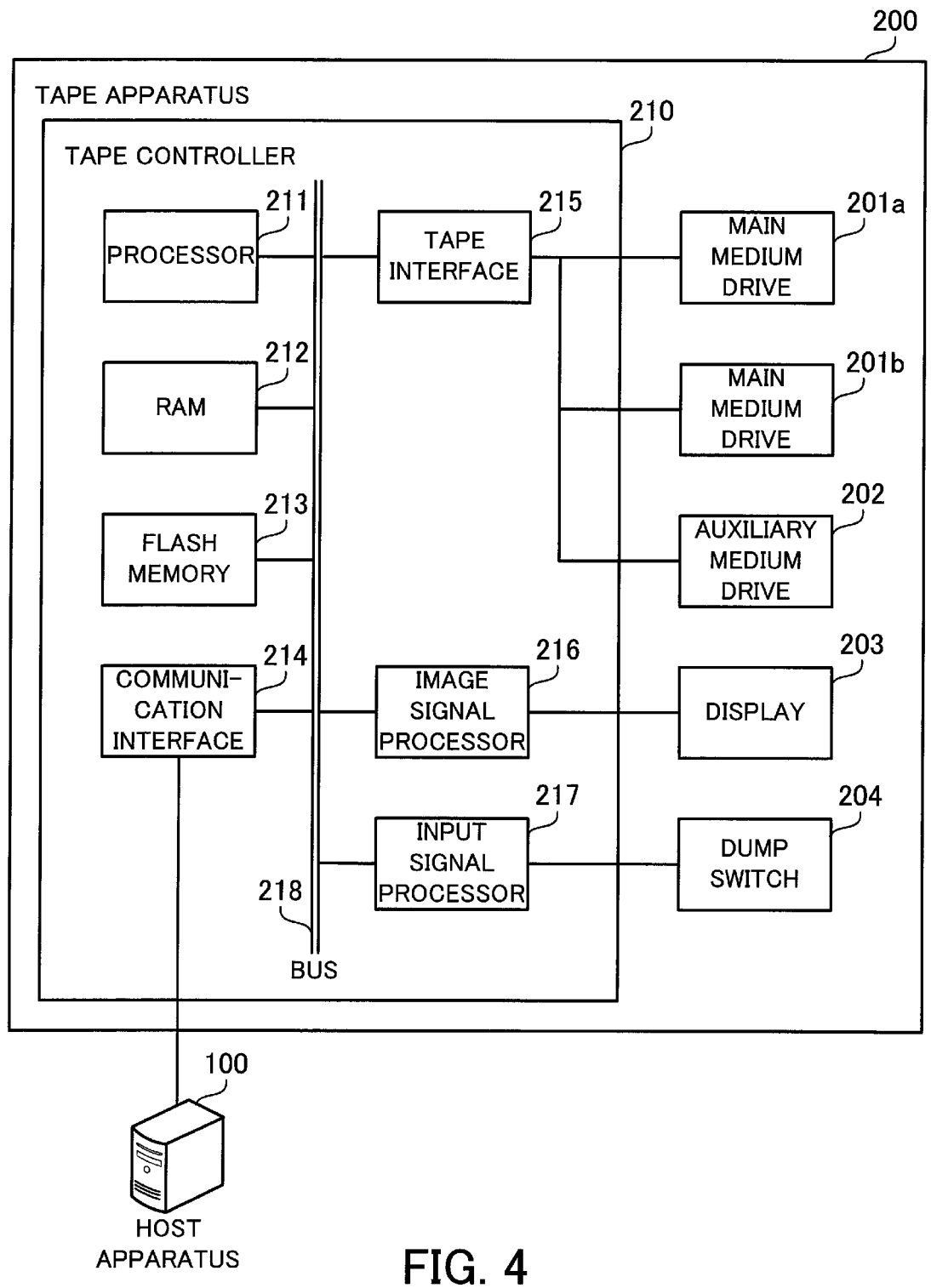
FIG. 4 illustrates an example of the hardware configuration of a tape apparatus.

FIG. 4 illustrates an example of the hardware configuration of the tape apparatus. The tape apparatus 200 includes main medium drives 201a and 201b, an auxiliary medium drive 202, a display 203, a dump switch 204, and a tape controller 210. The tape controller 210 includes a processor 211, a RAM 212, a flash memory 213, a communication interface 214, a tape interface 215, an image signal processor 216, and an input signal processor 217. Each of the main medium drives 201a and 201b is an example of the tape drive 12 in the first embodiment. The auxiliary medium drive 202 is an example of the tape drive 13 in the first embodiment.

Each unit in the tape controller 210 is connected to a bus 218. The main medium drives 201a and 201b and the auxiliary medium drive 202 are connected to the tape interface 215. The display 203 is connected to the image signal processor 216. The input signal processor 217 is connected to the dump switch 204.

Each of the main medium drives 201a and 201b and the auxiliary medium drive 202 is a drive unit which reads data from a tape medium mounted thereon or which writes data onto a tape medium mounted thereon. A main medium is mounted on each of the main medium drives 201a and 201b and an auxiliary medium is mounted on the auxiliary medium drive 202.

In this embodiment, for example, a tape drive on which a main medium is mounted and a tape drive on which an auxiliary medium is mounted are referred to as a "main medium drive" and an "auxiliary medium drive" respectively and a discrimination is made between them. Furthermore, it is assumed that the host apparatus 100 recognizes the main medium drives 201a and 201b and that the host apparatus 100 does not recognize the auxiliary medium drive 202. The reason for this is as follows. A user operates the host apparatus 100 to make a backup request. At this time the user can make a backup request only by designating a main medium drive which is made to write onto a main medium. The user is insensible of duplication onto an auxiliary medium.

A tape medium is a magnetic tape based on a standard such as LTO (Linear Tape Open which is a registered trademark). Furthermore, a tape medium is contained in a tape cartridge (not illustrated in FIG. 4) and a cartridge memory is attached to the tape cartridge. The cartridge memory is a contactless nonvolatile memory such as an EEPROM (Electrically Erasable Programmable Read-Only Memory). Each of the main medium drives 201a and 201b and the auxiliary medium drive 202 includes a device which reads data from and writes data to a cartridge memory. For example, management information for managing a tape medium contained in a tape cartridge is recorded in the cartridge memory.

The display 203 displays, for example, information regarding an auxiliary medium in accordance with an instruction from the processor 211. A LCD (Liquid Crystal Display), an organic EL (Electro Luminescence) display, or the like is used as the display 203.

The dump switch 204 is used for inputting to the tape controller 210 a signal (which may hereinafter be stated as a "management information request signal") which requests to display management information for an auxiliary medium.

The processor 211 includes an operation unit which executes a program instruction. This is the same with the above processor 101. The RAM 212 is a volatile memory which temporarily stores a program executed by the processor 211 or data. This is the same with the above RAM 102.

The flash memory 213 is a nonvolatile memory which stores software, such as an OS, firmware, and application programs, and data. The tape controller 210 may include a storage unit, such as a HDD, which differs from a flash memory in type, or include a plurality of nonvolatile storage units.

The communication interface 214 communicates with another information processing apparatus (host apparatus 100, for example). The tape interface 215 inputs data to or outputs data from at least one of the main medium drives 201a and 201b and the auxiliary medium drive 202 in accordance with an instruction from the processor 211. The image signal processor 216 outputs an image to the display 203 in accordance with an instruction from the processor 211. The input signal processor 217 acquires a management information request signal from the dump switch 204 and outputs it to the processor 211.

A program executed by the processor 211 may be copied from another storage unit to the flash memory 213.

Figure 5:
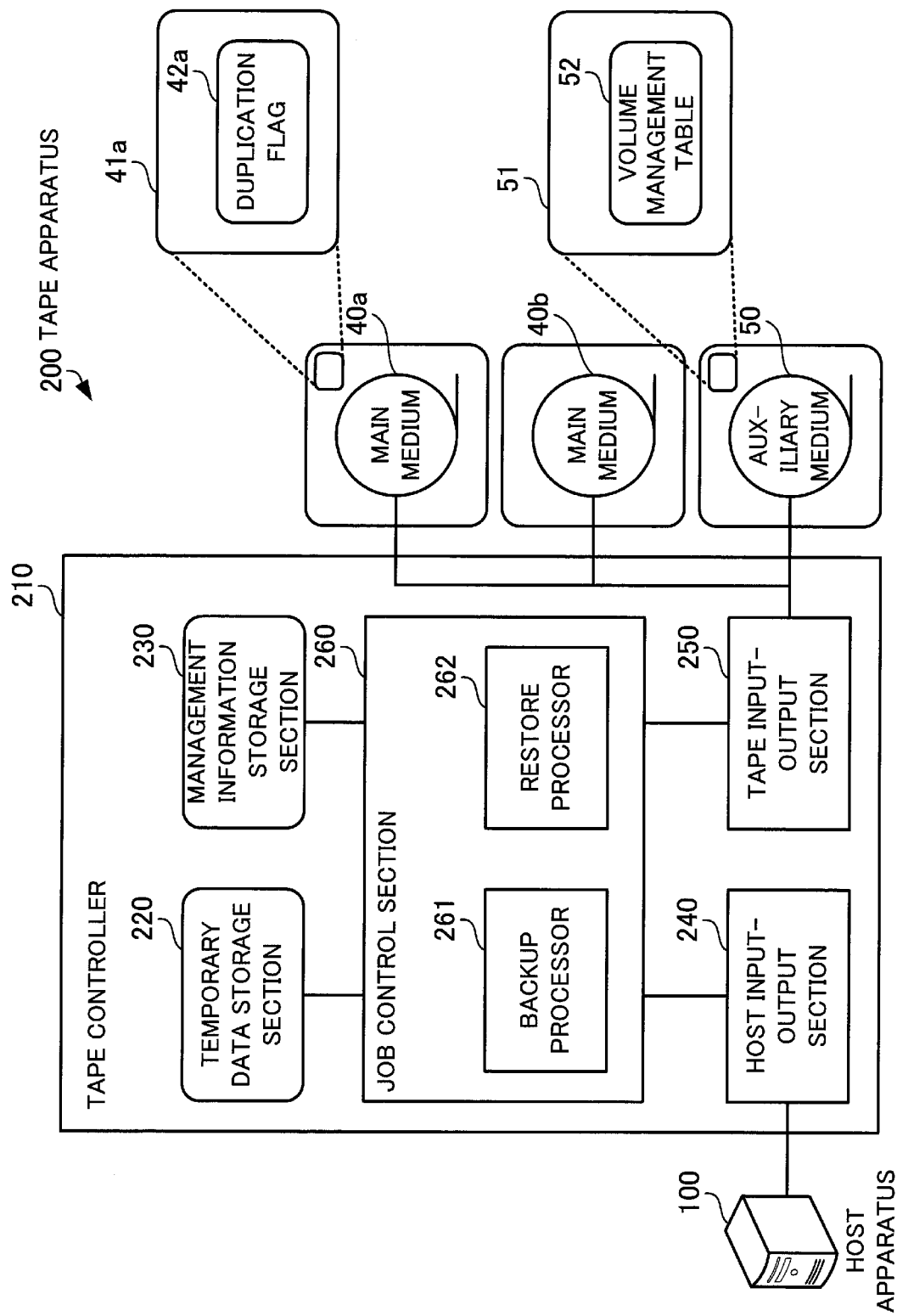
FIG. 5 illustrates an example of the structure of the function of a tape controller.

FIG. 5 illustrates an example of the structure of the function of the tape controller. FIG. 5 also indicates information recorded in cartridge memories.

In the example of FIG. 5, it is assumed that a main medium 40a is mounted on the main medium drive 201a, that a main medium 40b is mounted on the main medium drive 201b, and that an auxiliary medium 50 is mounted on the auxiliary medium drive 202. The main medium 40a is an example of the magnetic tape 21a in the first embodiment and the main medium 40b is an example of the magnetic tape 21b in the first embodiment. The auxiliary medium 50 is an example of the magnetic tape 22 in the first embodiment.

A duplication flag 42a is recorded in a cartridge memory 41a attached to a tape cartridge in which the main medium 40a is contained. The duplication flag 42a indicates whether or not a duplicate volume in which backup data stored in the corresponding main medium 40a is duplicated exists on another tape medium (that is to say, on the auxiliary medium). In this system, the duplication flag 42a is set to "TRUE" if there is a duplicate of the backup data. The duplication flag 42a is set to "FALSE" if there is no duplicate of the backup data. A duplication flag which is the same as the above duplication flag 42a is recorded in each of cartridge memories corresponding to the other main media including the main medium 40b.

A volume management table 52 is recorded in a cartridge memory 51 attached to a tape cartridge in which the auxiliary medium 50 is contained. Information regarding a storage location of a duplication source volume corresponding to a duplicate volume on the corresponding auxiliary medium 50 is registered in the volume management table 52. Hereinafter information regarding a storage location of a duplication source volume registered in the volume management table 52 may be stated as "volume management information". A volume management table which is the same as the above volume management table 52 is recorded in each of cartridge memories corresponding to the other auxiliary media.

The tape controller 210 includes a temporary data storage section 220, a management information storage section 230, a host input-output section 240, a tape input-output section 250, and a job control section 260. The temporary data storage section 220 and the management information storage section 230 are realized by storage areas in the RAM 212 or the flash memory 213. The host input-output section 240 is realized by the communication interface 214. The tape input-output section 250 is realized by the tape interface 215. The processor 211 executes a determined program. By doing so, the job control section 260 is realized.

The temporary data storage section 220 temporarily stores data for backup or restore. The management information storage section 230 stores an access management table in which information regarding the state of backup or restore is stored. In addition, the management information storage section 230 stores a log file in which information regarding a result obtained by executing a backup job or a restore job is stored. The host apparatus 100 can gain access to the log file. A user of the backup system 3 recognizes a result obtained by performing backup or restore in the past by referring to the log file from the host apparatus 100.

The host input-output section 240 receives a command from the host apparatus 100 and passes it to the job control section 260. In addition, the host input-output section 240 receives from the job control section 260 a result obtained by performing a process in accordance with a command, and transmits it to the host apparatus 100.

For example, the host input-output section 240 receives a volume backup request command from the host apparatus 100. Hereinafter a backup request command may be stated as a "backup command". A backup command includes an identifier of a main medium which is a backup destination of data, an identifier of a tape drive on which the main medium is mounted, and an identifier of a backup source volume.

Furthermore, the host input-output section 240 sends to the host apparatus 100 notice to the effect that the main medium designated by the backup command is mounted. To "mount" means fitting a tape medium (main medium 40a, for example) on a tape drive (main medium drive 201a, for example) and making the tape medium fitted on the tape drive accessible.

After that, the host input-output section 240 receives a data write request command from the host apparatus 100. The data write request command includes information (which may hereinafter be stated as "duplication designation information") indicative of whether or not there are instructions to duplicate backup data. For example, if duplication is designated, then the duplication designation information is set to "yes". If duplication is not designated, then the duplication designation information is set to "no". The data write request command includes data of determined length (data corresponding to one block, for example). In addition, this data write request command is received repeatedly until the number of times receiving is performed reaches the number of blocks included in a volume to be backed up.

Moreover, the host input-output section 240 receives a volume restore request command from the host apparatus 100. Hereinafter a restore request command may be stated as a "restore command". A restore command includes an identifier of a main medium drive, which is a restore source of data, and an identifier of a restore destination volume.

Furthermore, the host input-output section 240 sends to the host apparatus 100 notice to the effect that the main medium designated by the restore command is mounted. After that, the host input-output section 240 receives a data read request command from the host apparatus 100. In accordance with the data read request command, the host input-output section 240 receives from the job control section 260 data for which a read request is made, and transmits it to the host apparatus 100. The data read request command is received repeatedly until the number of times receiving is performed reaches the number of blocks included in a volume to be restored.

The tape input-output section 250 transmits a command to a designated tape drive in response to a request from the job control section 260. By doing so, the tape input-output section 250 makes the designated tape drive perform a process requested by the job control section 260. In addition, the tape input-output section 250 receives from the tape drive a result obtained by performing the requested process, and passes it to the job control section 260.

Processes which the tape input-output section 250 makes a tape drive perform include writing data onto a tape medium or to a cartridge memory, reading out data from a tape medium or a cartridge memory, rewinding a tape medium, and unloading a tape medium. "rewinding" means returning a tape medium to a designated access location. "unloading" means removing a tape medium from a tape drive.

The job control section 260 controls the execution of a backup job or a restore job. When the host input-output section 240 receives a backup command, the job control section 260 starts a backup job. When the host input-output section 240 receives a restore command, the job control section 260 starts a restore job.

The job control section 260 includes a backup processor 261 and a restore processor 262. When a backup command is received, the backup processor 261 executes a backup job. When a restore command is received, the restore processor 262 executes a restore job.

The backup processor 261 mounts a main medium designated by a backup command on a main medium drive designated by the backup command. When the main medium designated by the backup command is mounted on the main medium drive designated by the backup command, the backup processor 261 sends to the host apparatus 100 notice to the effect that access to the main medium can be performed. Hereinafter notice to the effect that access to a main medium can be performed may be stated as "accessibility notice".

The backup processor 261 temporarily stores in the temporary data storage section 220 data included in a write request command received by the host input-output section 240. The backup processor 261 writes the data temporarily stored in the temporary data storage section 220 onto the main medium mounted on the main medium drive designated by the backup command via the tape input-output section 250.

At this time the backup processor 261 writes the data temporarily stored onto the auxiliary medium 50 via the tape input-output section 250 as a duplicate of the data on the main medium if duplication designation information included in the write request command is set to "yes". When the backup processor 261 writes a duplicate of the data onto the auxiliary medium 50, the backup processor 261 generates volume management information on the basis of a location of the written data and registers the generated volume management information in the volume management table 52.

If the auxiliary medium 50 is being written for executing another backup job or if a request to discontinue writing is made for executing a restore job, then the backup processor 261 writes data onto the auxiliary medium 50 in the following way.

First the backup processor 261 stores in the access management table a location on a main medium at the time of discontinuing writing. If the auxiliary medium 50 is being written for executing another backup job, then a location on a main medium at the time of discontinuing writing is the head of the main medium. At this time the backup processor 261 continues writing onto the main medium until the auxiliary medium 50 becomes usable. After the backup processor 261 ends writing, the backup processor 261 refers to the access management table and rewinds the main medium to the location at the time of discontinuing writing, that is to say, to the head. When the auxiliary medium 50 becomes usable, the backup processor 261 reads out data from the rewound location on the main medium and writes the data onto the auxiliary medium 50. By doing so, a duplicate of the data is written onto the auxiliary medium 50.

The restore processor 262 mounts a main medium designated by a restore command on a main medium drive designated by the restore command. When the main medium designated by the restore command is mounted on the main medium drive designated by the restore command, the restore processor 262 sends accessibility notice to the host apparatus 100.

The restore processor 262 reads out data from a main medium designated by a read request command via the tape input-output section 250 and stores the data read out in the temporary data storage section 220. When the restore processor 262 fails in reading out the data from the main medium, the restore processor 262 reads out a duplicate of the data from the auxiliary medium 50 in the following way.

First the restore processor 262 stores in the access management table a location of the data which the restore processor 262 fails in reading out. On the basis of the access management table and the volume management table 52, the restore processor 262 then specifies a storage area of the auxiliary medium 50 where a duplicate of the data which the restore processor 262 fails in reading out is stored. Next, the restore processor 262 reads out the data from the specified storage area via the tape input-output section 250 and stores the data read out in the temporary data storage section 220. If at this time data is being written onto the auxiliary medium 50 for executing a backup job, then a request to discontinue writing performed for executing the backup job is made. Hereinafter, a request to discontinue writing which is made for using the auxiliary medium 50 may be stated as an "auxiliary medium use request".

In addition, the restore processor 262 transmits the data stored in the temporary data storage section 220 to the host apparatus 100 via the host input-output section 240.

Each of the backup processor 261 and the restore processor 262 has the function of realizing exclusive control over the auxiliary medium 50. The details of exclusive control will be described later in FIGS. 10, 11, and 15 through 17.

The tables used by the backup system 3 will now be described by the use of FIGS. 6 and 7.

FIG. 6 indicates an example of the volume management table. Records in the volume management table 52 are stored in order of registration. That is to say, a record registered just before is stored last in (at the bottom of) the volume management table 52. In the volume management table 52 indicated in FIG. 6, for example, information regarding a volume whose identifier is "VOL999" is registered later than information regarding a volume whose identifier is "VOL001".

The volume management table 52 includes Volume, Start Location, Last Location, and State items. An identifier of a volume duplicated on the auxiliary medium 50 is set in the Volume item. Information indicative of a start location of an area of the auxiliary medium 50 in which a corresponding volume is stored is set in the Start Location item. Information indicative of a last location of an area of the auxiliary medium 50 in which a corresponding volume is stored is set in the Last Location item. In the backup system 3, a start location and a last location are expressed in blocks. However, a start location and a last location may be expressed in bytes or the like. In addition, it is assumed that blocks on each medium begin at a zeroth block.

Information indicative of the state of data in a corresponding stored volume is set in the State item. For example, the state "ON" indicates that data in a corresponding volume is valid. The state "OFF" indicates that data in a corresponding volume is invalid. The state "ERR" indicates that writing fails in duplication for a corresponding volume. In this case, for example, "(last)" is stored beside information indicative of a location in the Last Location item.

FIG. 7 indicates an example of the access management table. An access management table 231 temporarily stores information regarding the state of access, such as backup or restore. The access management table 231 is stored in the management information storage section 230. The access management table 231 includes Volume, Write Failure Location, Rewind Location, and Read Failure Location items. An identifier of a volume which is being duplicated is set in the Volume item.

Information indicative of a write location on the auxiliary medium 50 at the time of failing in writing onto the auxiliary medium 50 by a backup job is set in the Write Failure Location item. If writing does not fail, then "NULL" is set in the Write Failure Location item.

Information indicative of a location to which a main medium is rewound and which is used for resuming writing onto the auxiliary medium 50 by a backup job is set in the Rewind Location item. If there is no need to rewind a main medium for executing a backup job, then "NULL" is set in the Rewind Location item.

Information indicative of a read location on a main medium at the time of failing in reading from the main medium by a restore job is set in the Read Failure Location item. If reading does not fail, then "NULL" is set in the Read Failure Location item.

A backup job will now be described by the use of FIGS. 8 through 11.

Figure 8:
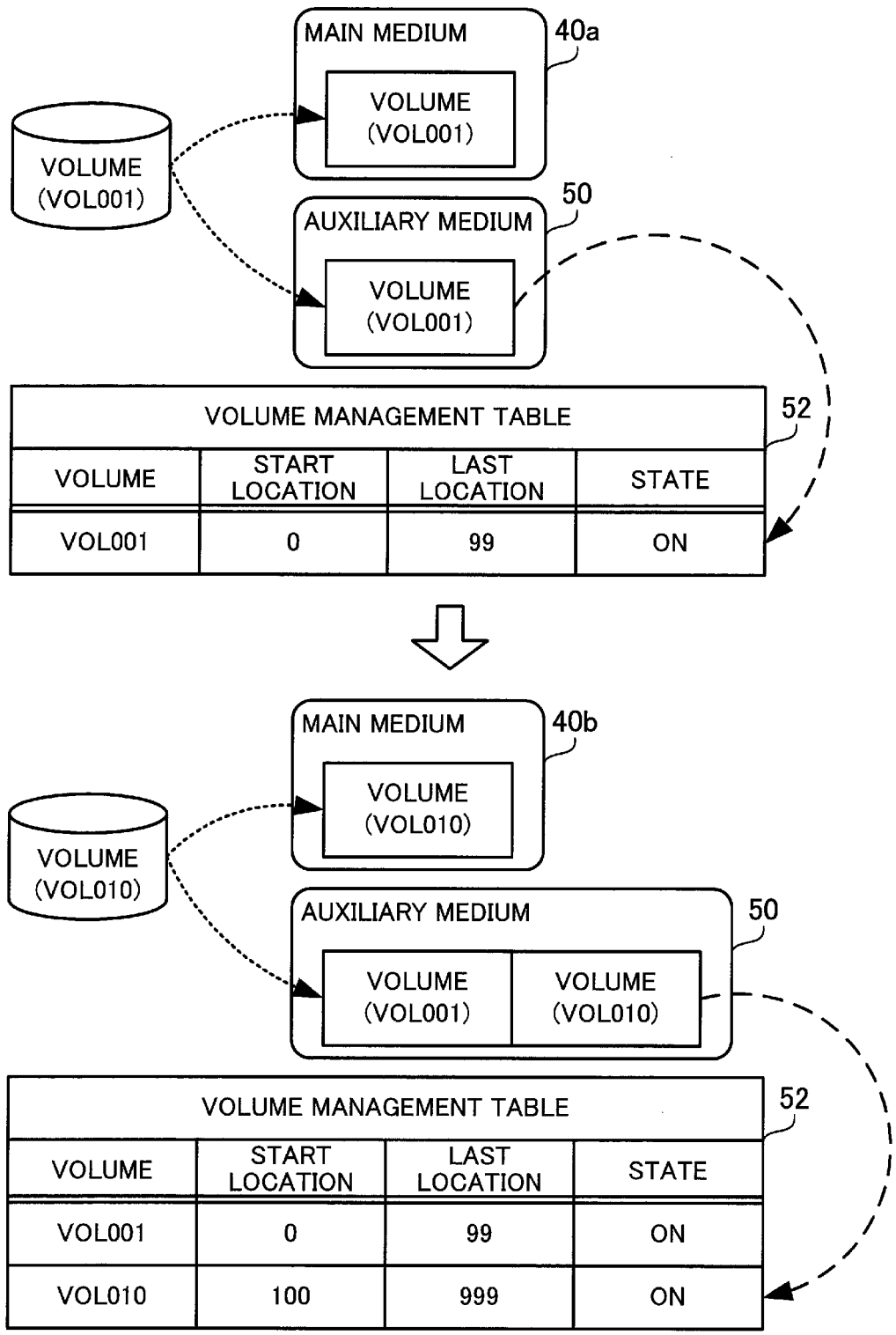
FIG. 8 illustrates an example of writing a duplicate by a backup job.

FIG. 8 illustrates an example of writing a duplicate by a backup job. A main medium 40a is mounted, for example, on the main medium drive 201a. An auxiliary medium 50 is mounted on the auxiliary medium drive 202. Furthermore, it is assumed that no volume is recorded on the auxiliary medium 50.

In this state of things, it is assumed that the tape apparatus 200 receives from the host apparatus 100 a backup command which gives instructions to back up data from a volume whose identifier is "VOL001" to the main medium 40a. Hereinafter a volume whose identifier is "VOL001" may be stated as a 'volume "VOL001"'. In addition, data in the volume "VOL001" corresponds to 100 blocks. At this time the tape apparatus 200 starts a backup job for the data in the volume "VOL001". Hereinafter a backup job for backing up the data in the volume "VOL001" may be stated as a 'backup job "VOL001"'. Furthermore, it is assumed that duplication designation information included in a write request command received later is set to "yes". The same applies to FIGS. 9 through 11.

As illustrated in the upper part of FIG. 8, when the backup processor 261 executes the backup job "VOL001", the backup processor 261 writes the data in the volume "VOL001" onto the main medium 40a and the auxiliary medium 50 in parallel. In addition, the backup processor 261 registers volume management information regarding the volume "VOL001" in the volume management table 52 for the auxiliary medium 50. In this case, the volume management information is as follows. A volume is "VOL001", a start location is "0", a last location is "99" which means a 100th block from the zeroth block that is a start location, and a state is "ON". The backup processor 261 then unloads the main medium 40a.

Next, it is assumed that the tape apparatus 200 receives from the host apparatus 100 a backup command which gives instructions to back up data from a volume whose identifier is "VOL010" to a main medium 40b. The data in the volume "VOL010" corresponds to 900 blocks. At this time the tape apparatus 200 starts a backup job "VOL010".

As illustrated in the lower part of FIG. 8, when the backup processor 261 executes the 'backup job "VOL010"', the backup processor 261 writes the data in the volume "VOL010" onto the main medium 40b and the auxiliary medium 50 in parallel. As illustrated in the lower part of FIG. 8, at this time the data in the volume "VOL010" is added onto the auxiliary medium 50 from a location next to the last location of the volume "VOL001".

In addition, after the backup processor 261 writes the data in the volume "VOL010" onto the auxiliary medium 50, the backup processor 261 registers volume management information regarding the volume "VOL010" in the volume management table 52 for the auxiliary medium 50. In this case, the volume management information is as follows. A volume is "VOL010", a start location is "100" which means a block next to the last location of the data written just before, a last location is "999" which means a 900th block from the 100th block that is a start location, and a state is "ON".

As has been described, backup data is written onto a main medium and an auxiliary medium in parallel by a backup job. At this time the backup data is added onto the auxiliary medium next to data written just before. As a result, duplicates of volumes on a plurality of main media are written onto one auxiliary medium and the number of auxiliary media decreases.

Figure 9:
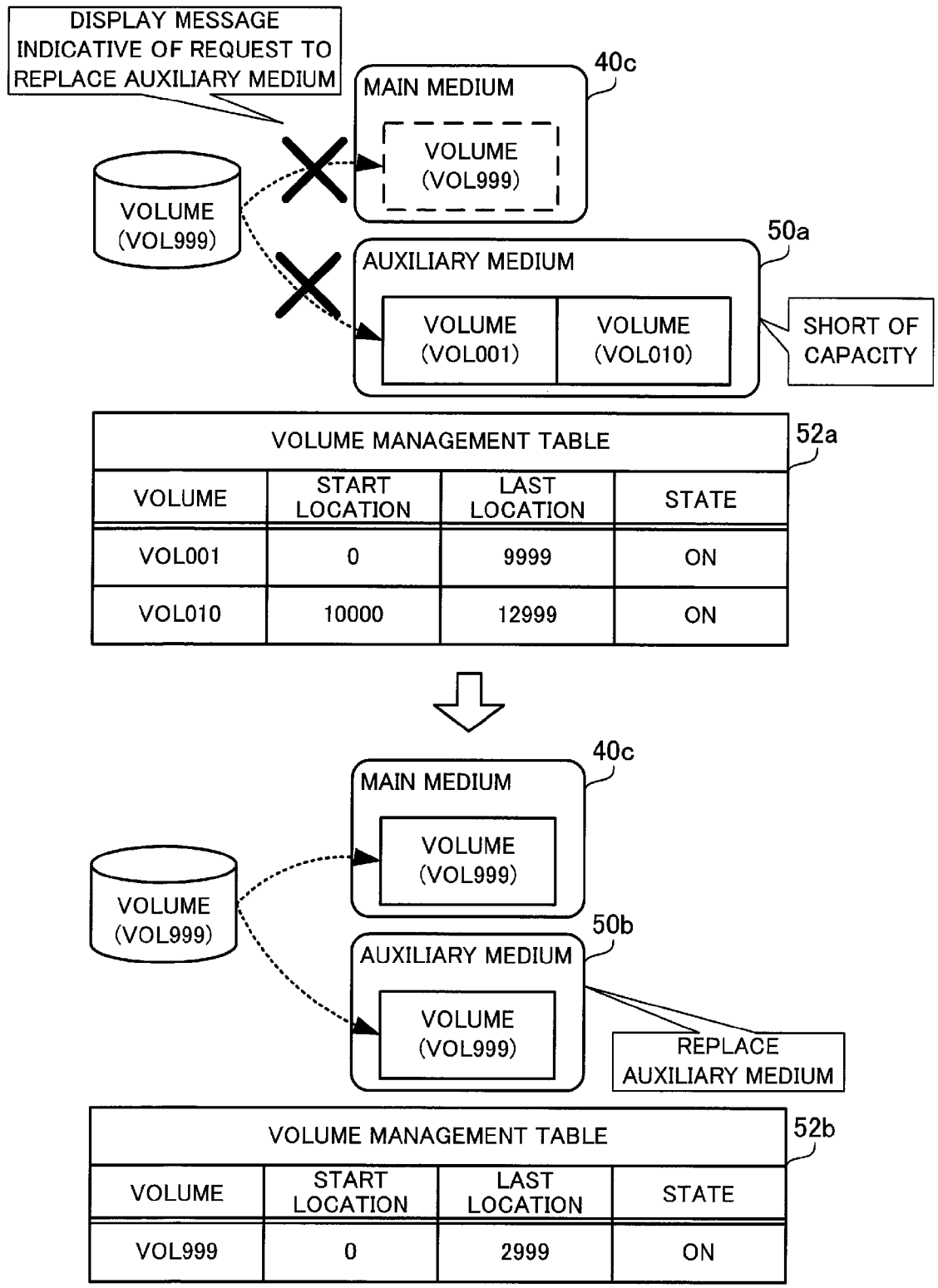
FIG. 9 illustrates an example of writing a duplicate in the case of an auxiliary medium being short of capacity.

FIG. 9 illustrates an example of writing a duplicate in the case of an auxiliary medium being short of capacity. A volume management table 52a is for an auxiliary medium 50a and a volume management table 52b is for an auxiliary medium 50b. In an initial state in FIG. 9, a main medium 40c is mounted on the main medium drive 201a and the auxiliary medium 50a is mounted on the auxiliary medium drive 202.

Furthermore, as illustrated in FIG. 9, data in a volume "VOL001" and data in a volume "VOL010" are stored on the auxiliary medium 50a. Data corresponding to 10000 blocks is stored in the volume "VOL001" and data corresponding to 3000 blocks is stored in the volume "VOL010". That is to say, data corresponding to 13000 blocks is stored on the auxiliary medium 50a. Moreover, data corresponding to 15000 blocks can be stored on the auxiliary medium 50a. On the other hand, data is not written onto the auxiliary medium 50b and there is free capacity corresponding to at least 3000 blocks.

In this state of things, it is assumed that the tape apparatus 200 receives from the host apparatus 100 a backup command which gives instructions to back up data from a volume "VOL999" to the main medium 40c. Furthermore, the data in the volume "VOL999" corresponds to 3000 blocks. At this time the tape apparatus 200 starts a backup job "VOL999".

Free capacity of the auxiliary medium 50a is smaller than the length of the data in the volume "VOL999". Therefore, as illustrated in the upper part of FIG. 9, when the backup processor 261 executes the backup job "VOL999", the backup processor 261 does not back up the data to the main medium 40c or the auxiliary medium 50a but displays on the display 203 a message indicative of a request to replace the auxiliary medium 50a.

After that, it is assumed that the tape apparatus 200 receives again from the host apparatus 100 the same backup command that is described in the upper part of FIG. 9 in a state in which the auxiliary medium 50a mounted on the auxiliary medium drive 202 is replaced with the auxiliary medium 50b. At this time the tape apparatus 200 starts the backup job "VOL999" again.

Free capacity of the auxiliary medium 50b is larger than the length of the data in the volume "VOL999". Therefore, the backup processor 261 writes the data in the volume "VOL999" onto the main medium 40c and the auxiliary medium 50b in parallel.

In addition, the backup processor 261 registers volume management information regarding the volume "VOL999" in a volume management table 52b for the auxiliary medium 50b. In this case, the volume management information is as follows. A volume is "VOL999", a start location is "0", a last location is "2999" which means a 3000th block from the zeroth block that is a start location, and a state is "ON".

Figure 10:
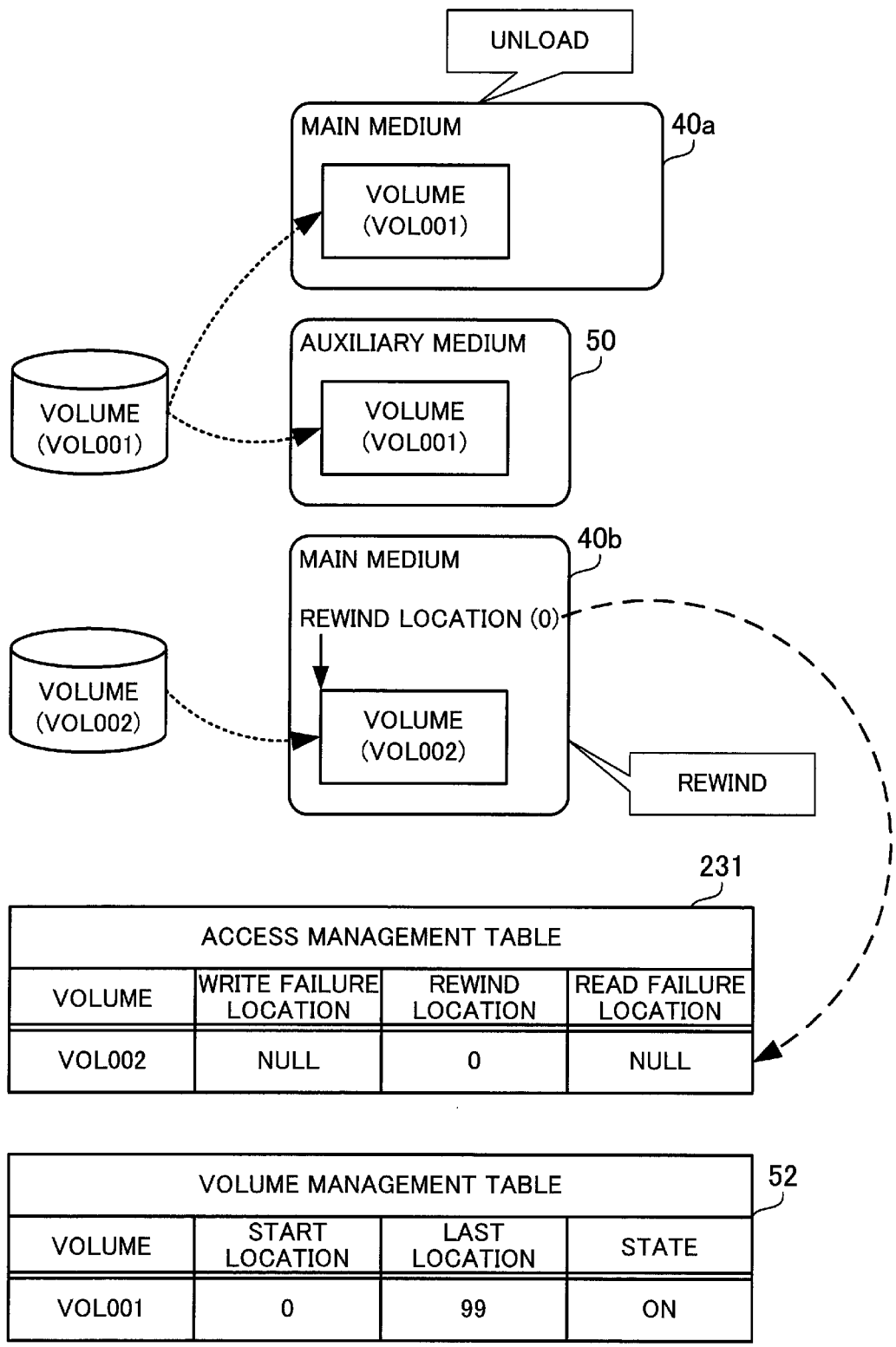
FIG. 10 illustrates an example of executing plural backup jobs in parallel (part 1)

FIG. 10 illustrates an example of executing plural backup jobs in parallel (part 1). A main medium 40a is mounted on the main medium drive 201a and a main medium 40b is mounted on the main medium drive 201b. An auxiliary medium 50 is mounted on the auxiliary medium drive 202.

In this state of things, it is assumed that the tape apparatus 200 receives from the host apparatus 100 a backup command which gives instructions to back up data from a volume "VOL001" to the main medium 40a. At this time the tape apparatus 200 starts a backup job "VOL001". In addition, it is assumed that before completing backing up the data in the volume "VOL001", the tape apparatus 200 receives from the host apparatus 100 a backup command which gives instructions to back up data from a volume "VOL002" to the main medium 40b. At this time the tape apparatus 200 starts a backup job "VOL002". The data in the volume "VOL001" corresponds to 100 blocks and the data in the volume "VOL002" corresponds to 900 blocks.

In this case, the backup job "VOL001" is executed in the following way. As illustrated in FIG. 10, first the backup processor 261 writes the data in the volume "VOL001" onto the main medium 40a and the auxiliary medium 50 in parallel. After the backup processor 261 completes writing the data in the volume "VOL001", the backup processor 261 unloads the main medium 40a. Furthermore, the backup processor 261 registers volume management information regarding the volume "VOL001" in the volume management table 52. In this case, the volume management information is as follows. A volume is "VOL001", a start location is "0", a last location is "99" which means a 100th block from the zeroth block that is a start location, and a state is "ON".

On the other hand, as illustrated in FIG. 10, when the backup processor 261 is executing the backup job "VOL002", the auxiliary medium 50 is used for executing the backup job "VOL001". Accordingly, it is impossible to write the data in the volume "VOL002" onto the main medium 40b and the auxiliary medium 50 in parallel. In this case, the backup job "VOL002" is executed in the following way.

First the backup processor 261 writes the data in the volume "VOL002" only onto the main medium 40b. In addition, the backup processor 261 registers information regarding the state of access in the access management table 231. The registered information regarding the state of access is as follows. A volume is "VOL002", a write failure location is "NULL", a rewind location is "0", and a read failure location is "NULL".

After the backup processor 261 completes writing the data in the volume "VOL002" onto the main medium 40b, the backup processor 261 does not unload the main medium 40b and rewinds the main medium 40b to the rewind location registered in the access management table 231, that is to say, to the head.

Figure 11:
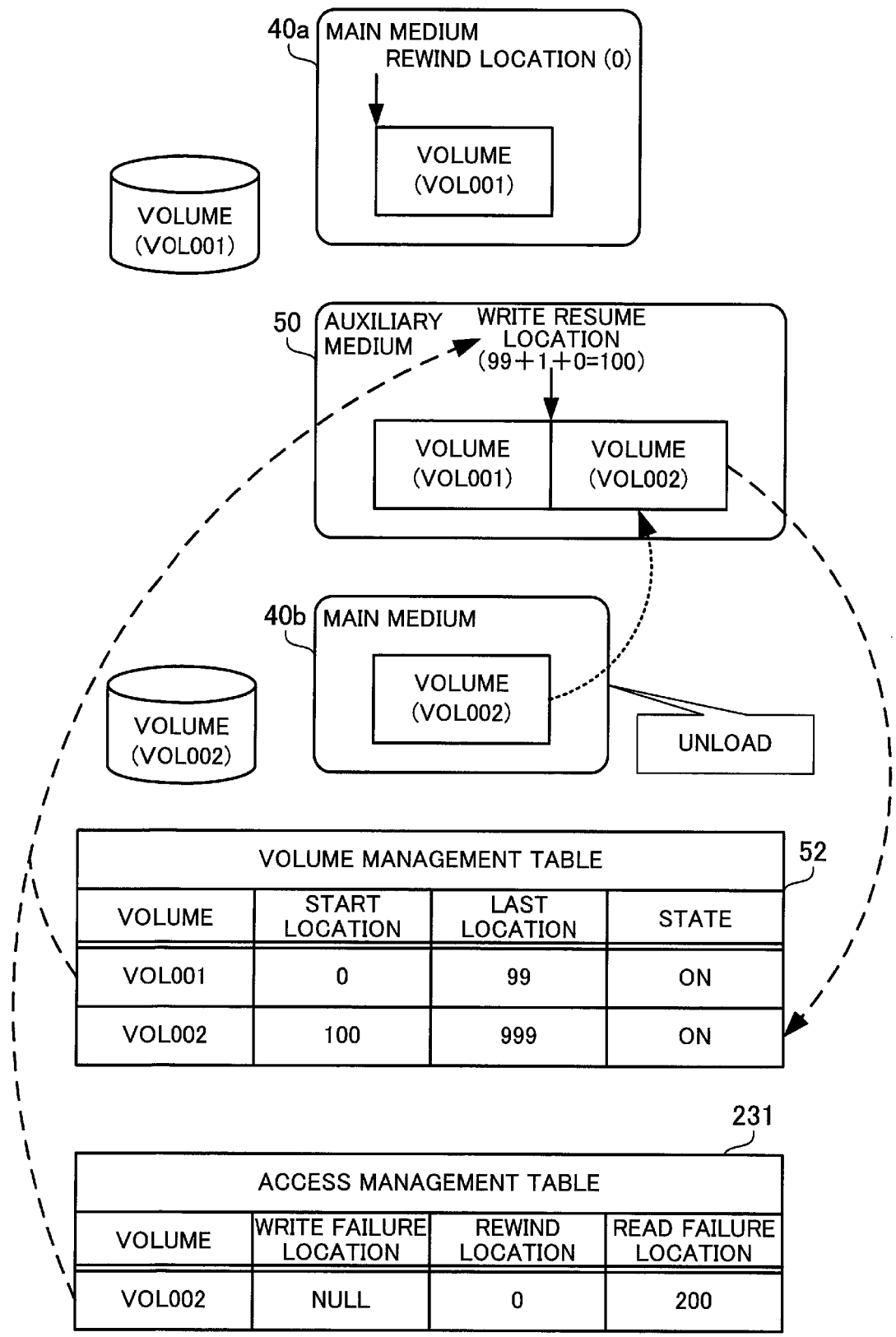
FIG. 11 illustrates an example of executing plural backup jobs in parallel (part 2)

FIG. 11 illustrates an example of executing the plural backup jobs in parallel (part 2). As illustrated in FIG. 11, to execute the backup job "VOL002", the backup processor 261 then reads out the data written onto the main medium 40b, and adds it onto the auxiliary medium 50. At this time the data in the volume "VOL002" is added from a block (that is to say, from a 100th block (=99+1+0)) calculated by adding the rewind location to a block next to the last location of the data written just before (that is to say, of the data in the volume "VOL001"). After the backup processor 261 completes writing onto the auxiliary medium 50 the data on the main medium 40b, the backup processor 261 unloads the main medium 40b.

Furthermore, the backup processor 261 registers volume management information regarding the volume "VOL002" in the volume management table 52. In this case, the volume management information is as follows. A volume is "VOL002", a start location is "100" which means a block next to the last location of the data written just before, a last location is "999" which means a 900th block from the start location, and a state is "ON".

As has been described, if plural backup jobs are executed in parallel, exclusive control is exercised over the auxiliary medium 50. This makes it possible to normally complete two backup jobs the execution of one of which is begun during the execution of the other.

Furthermore, in the above example, the main medium 40b is rewound to the head and the data read out from the main medium 40b is written onto the auxiliary medium 50. By doing so, writing onto the auxiliary medium 50 is performed in the backup job "VOL002". As a result, for example, there is no need to hold in a storage area in the tape apparatus 200 all the data in the volume "VOL002" to be written onto the auxiliary medium 50. This reduces storage capacity which the tape apparatus 200 needs.

A restore job will now be described by the use of FIGS. 12 through 17.

Figure 12:
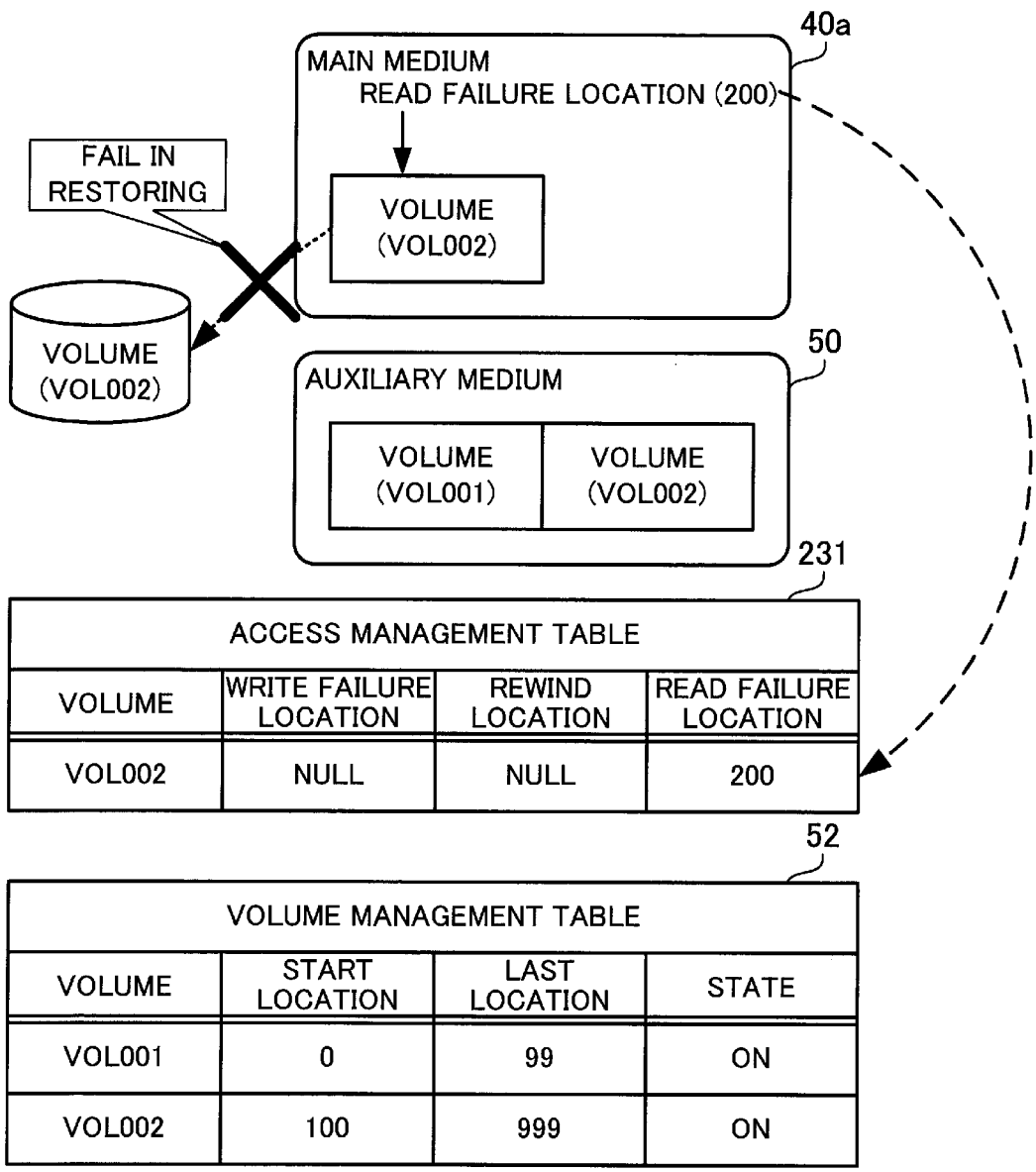
FIG. 12 illustrates an example of recovery by a restore job (part 1)

FIG. 12 illustrates an example of recovery by a restore job (part 1). In FIG. 12, a main medium 40a is mounted on the main medium drive 201a and an auxiliary medium 50 is mounted on the auxiliary medium drive 202.

Data in a volume "VOL002" is stored on the main medium 40a. Data in a volume "VOL001" and the data in the volume "VOL002" are written onto the auxiliary medium 50. The data in the volume "VOL001" corresponds to 100 blocks and the data in the volume "VOL002" corresponds to 900 blocks. In addition, a record including the volume "VOL001", the start location "0", the last location "99", and the state ON is stored in the volume management table 52. Furthermore, a record including the volume "VOL002 ", the start location "100", the last location "999", and the state ON is stored in the volume management table 52.

In this state of things, it is assumed that the tape apparatus 200 receives from the host apparatus 100 a restore command which gives instructions to restore the data in the volume "VOL002" from the main medium 40a. At this time the tape apparatus 200 starts a restore job for restoring the data in the volume "VOL002". Hereinafter a restore job for restoring the data in the volume "VOL002" may be stated as a 'restore job "VOL002"'. When the restore processor 262 executes the restore job "VOL002", the restore processor 262 reads out the data in the volume "VOL002" from the main medium 40a and transmits the data read out to the host apparatus 100. The restore processor 262 repeats this process by the block.

It is assumed that during the execution of the restore job "VOL002" the restore processor 262 fails in reading out from a 200th block on the main medium 40a. At this time the restore processor 262 first registers information regarding the state of access in the access management table 231. The registered information regarding the state of access is as follows. A volume is "VOL002", a write failure location is "NULL, a rewind location is "NULL, and a read failure location is "200".

Figure 13:
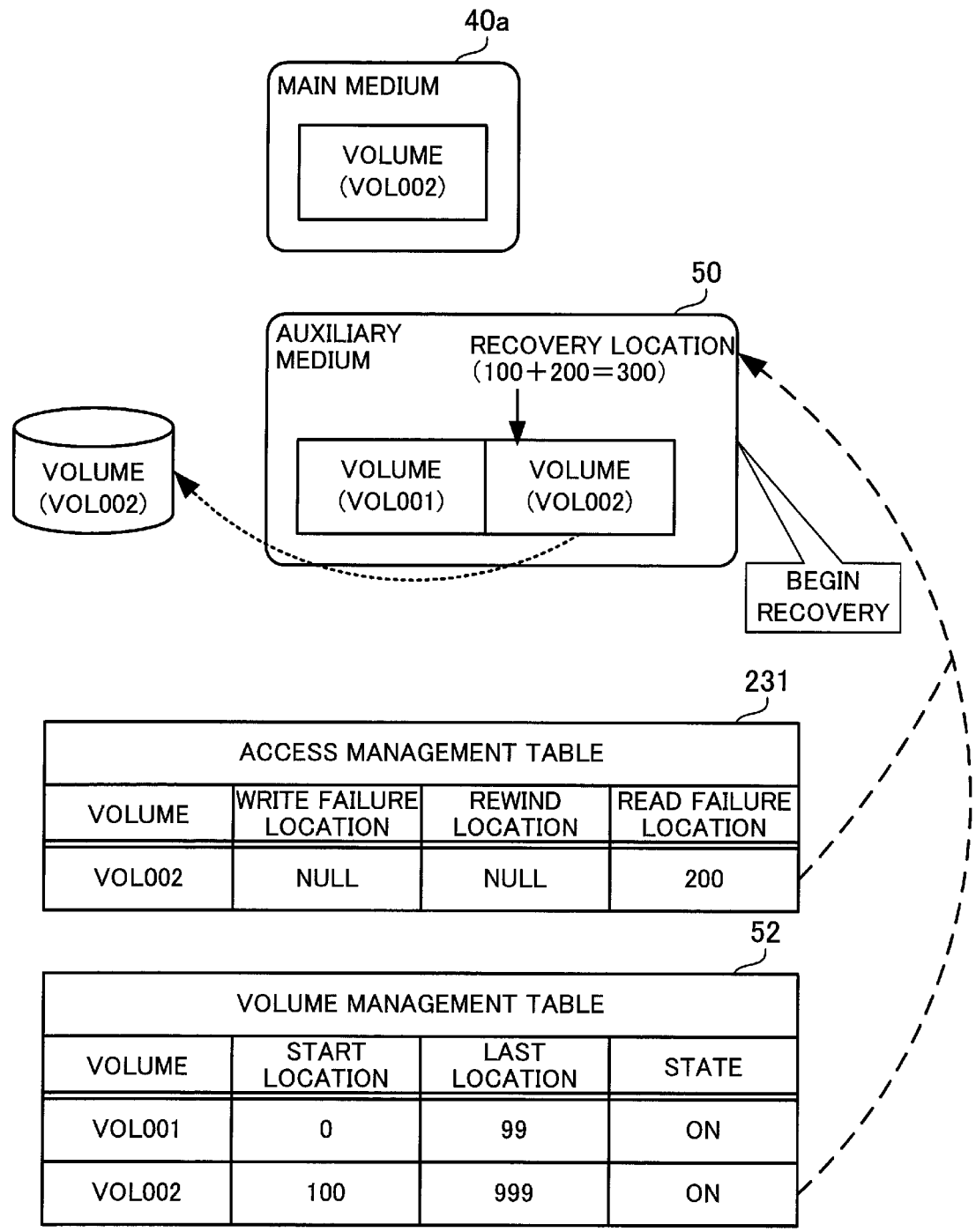
FIG. 13 illustrates an example of recovery by a restore job (part 2)

FIG. 13 illustrates an example of recovery by the restore job (part 2). On the basis of the read failure location registered in the access management table 231 and volume management information regarding the volume "VOL002", the restore processor 262 then calculates a location on the auxiliary medium 50 at which a duplicate of data which the restore processor 262 fails in reading out is stored. Hereinafter a location on an auxiliary medium at which a duplicate of data which the restore processor 262 fails in reading out is stored may be stated as a "recovery location". As illustrated in FIG. 13, volume management information regarding the volume "VOL002" is registered in the volume management table 52.

In this case, a read failure location is "200" and a start location of a storage area of the volume "VOL002" on the auxiliary medium 50 is "100". Accordingly, the recovery location "300" is calculated.

The restore processor 262 then reads out from the calculated recovery location data in a corresponding block and transmits the data read out to the host apparatus 100. Hereinafter to read out from an auxiliary medium a duplicate of data which the restore processor 262 fails in reading out from a main medium and to transmit the data read out to the host apparatus 100, as stated above, may be stated as "recovery".

Figure 14:
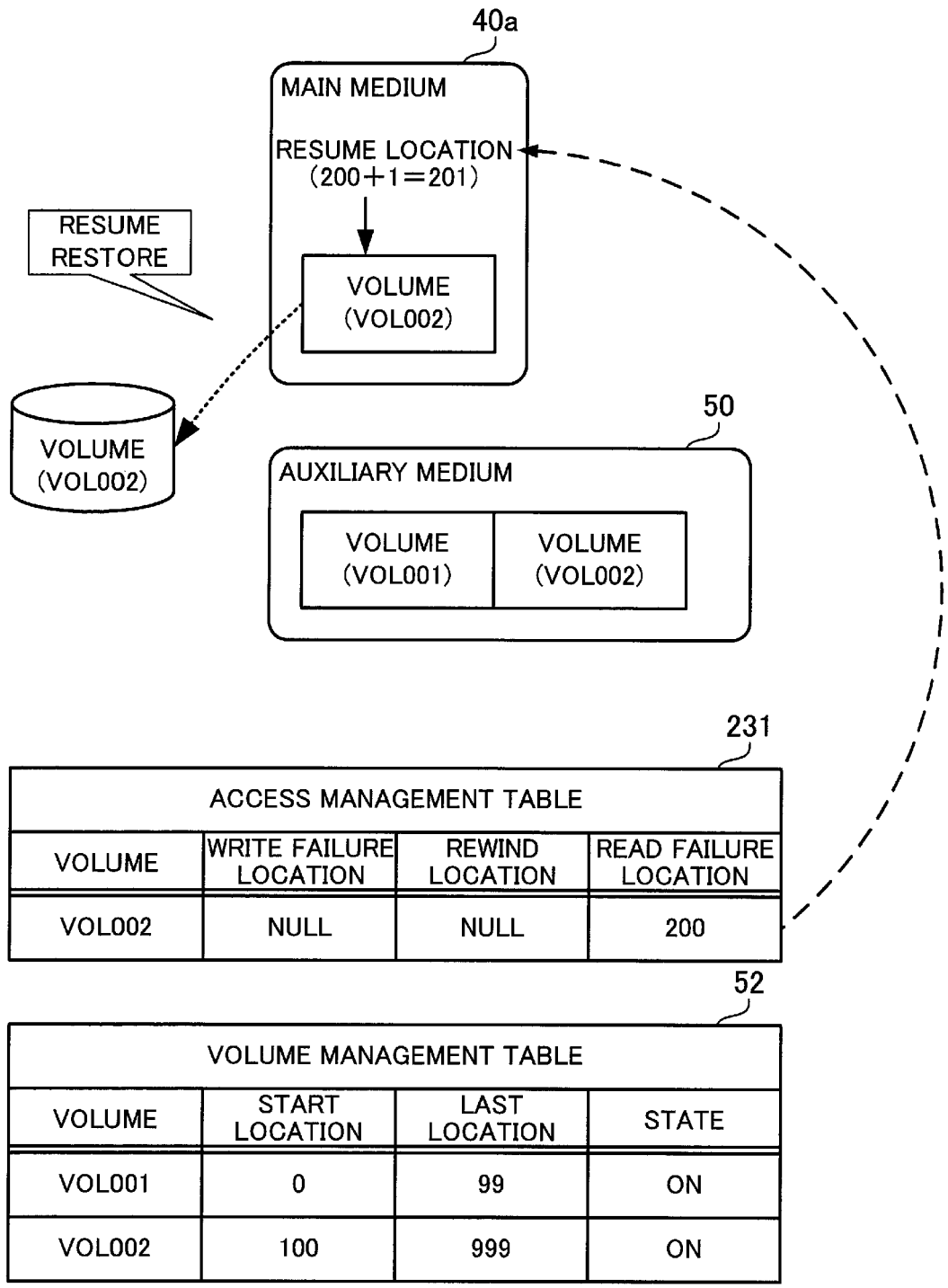
FIG. 14 illustrates an example of recovery by a restore job (part 3)

FIG. 14 illustrates an example of recovery by the restore job (part 3). After the restore processor 262 performs recovery from the auxiliary medium 50, the restore processor 262 resumes restoring data from a block next to the read failure location on the main medium 40a. Hereinafter the location of a block on a main medium at which the restore processor 262 resumes restoring may be stated as a "resume location". Furthermore, in this case, a resume location on the main medium 40a of the restore job "VOL002" is a "201st block (=200+1)".

In a restore job, as described in FIGS. 12 through 14, when the restore processor 262 fails in restoring data from a main medium, the restore processor 262 recovers the data which the restore processor 262 fails in reading out from a recovery location on an auxiliary medium calculated on the basis of volume management information regarding a volume to be restored and a read failure location.

Figure 15:
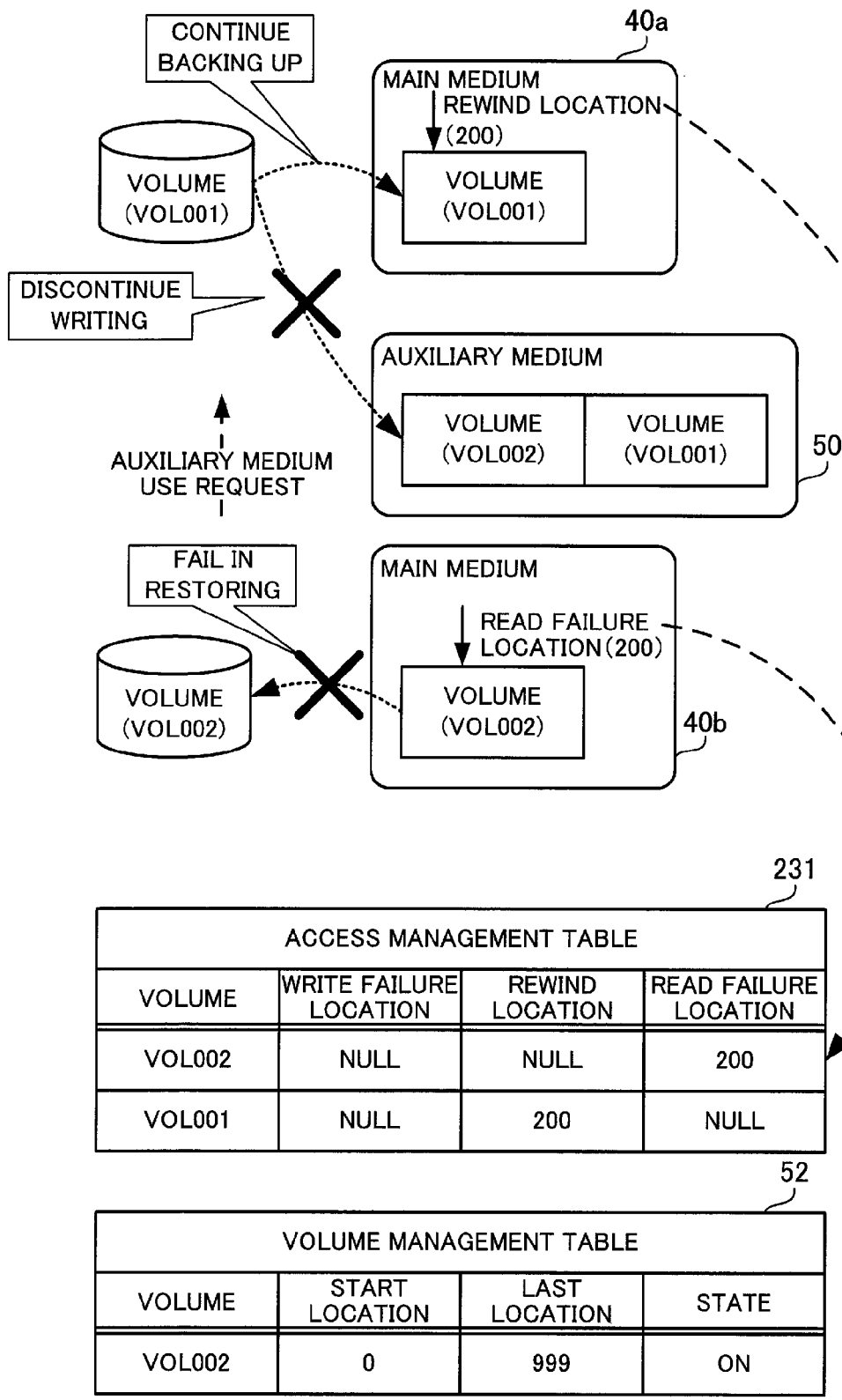
FIG. 15 illustrates an example of executing a backup job and a restore job in parallel (part 1)

FIG. 15 illustrates an example of executing a backup job and a restore job in parallel (part 1). In FIG. 15, a main medium 40a is mounted on the main medium drive 201a and a main medium 40b is mounted on the main medium drive 201b. An auxiliary medium 50 is mounted on the auxiliary medium drive 202.

Data in a volume "VOL002" is stored on the main medium 40a and the auxiliary medium 50. The data in the volume "VOL002" corresponds to 1000 blocks. Furthermore, a record including the volume "002", the start location "0", the last location "999", and the state "ON" is stored in the volume management table 52.

In this state of things, it is assumed that the tape apparatus 200 receives from the host apparatus 100 a backup command which gives instructions to back up data from a volume "VOL001" to the main medium 40a. At this time the tape apparatus 200 starts a backup job "VOL001". In addition, it is assumed that the tape apparatus 200 receives from the host apparatus 100 a restore command which gives instructions to restore the data in the volume "VOL002" from the main medium 40b. At this time the tape apparatus 200 starts a restore job "VOL002".

When the backup processor 261 executes the backup job "VOL001", the backup processor 261 first writes the data in the volume "VOL001" onto the main medium 40a and the auxiliary medium 50 in parallel. Furthermore, the restore job "VOL002" and the backup job "VOL001" are executed in parallel and the restore processor 262 restores the data from the main medium 40b.

It is assumed that before backing up the data in the volume "VOL001" ends, the restore processor 262 fails in reading out from a 200th block on the main medium 40b. At this time the restore processor 262 first registers information regarding the state of access in the access management table 231. The registered information regarding the state of access is as follows. A volume is "VOL002", a write failure location is "NULL, a rewind location is "NULL, and a read failure location is "200". Next, the restore processor 262 outputs an auxiliary medium use request to the backup processor 261 which is using the auxiliary medium 50, which is a recovery source.

The backup processor 261 which is executing the backup job "VOL001" discontinues writing the data onto the auxiliary medium 50 (that is to say, using the auxiliary medium 50) in response to the auxiliary medium use request. The backup processor 261 registers a write location on the main medium 40a at this time as a rewind location in the access management table 231. To be concrete, it is assumed that a write location on the main medium 40a at the time of discontinuing writing the data is "200". Then registered information regarding the state of access is as follows. A volume is "VOL001", a write failure location is "NULL, a rewind location is "200, and a read failure location is "NULL".

After that, the backup processor 261 continues backing up the data onto the main medium 40a. When the backup processor 261 completes writing the data onto the main medium 40a, the backup processor 261 rewinds the main medium 40a to the registered rewind location.

Figure 16:
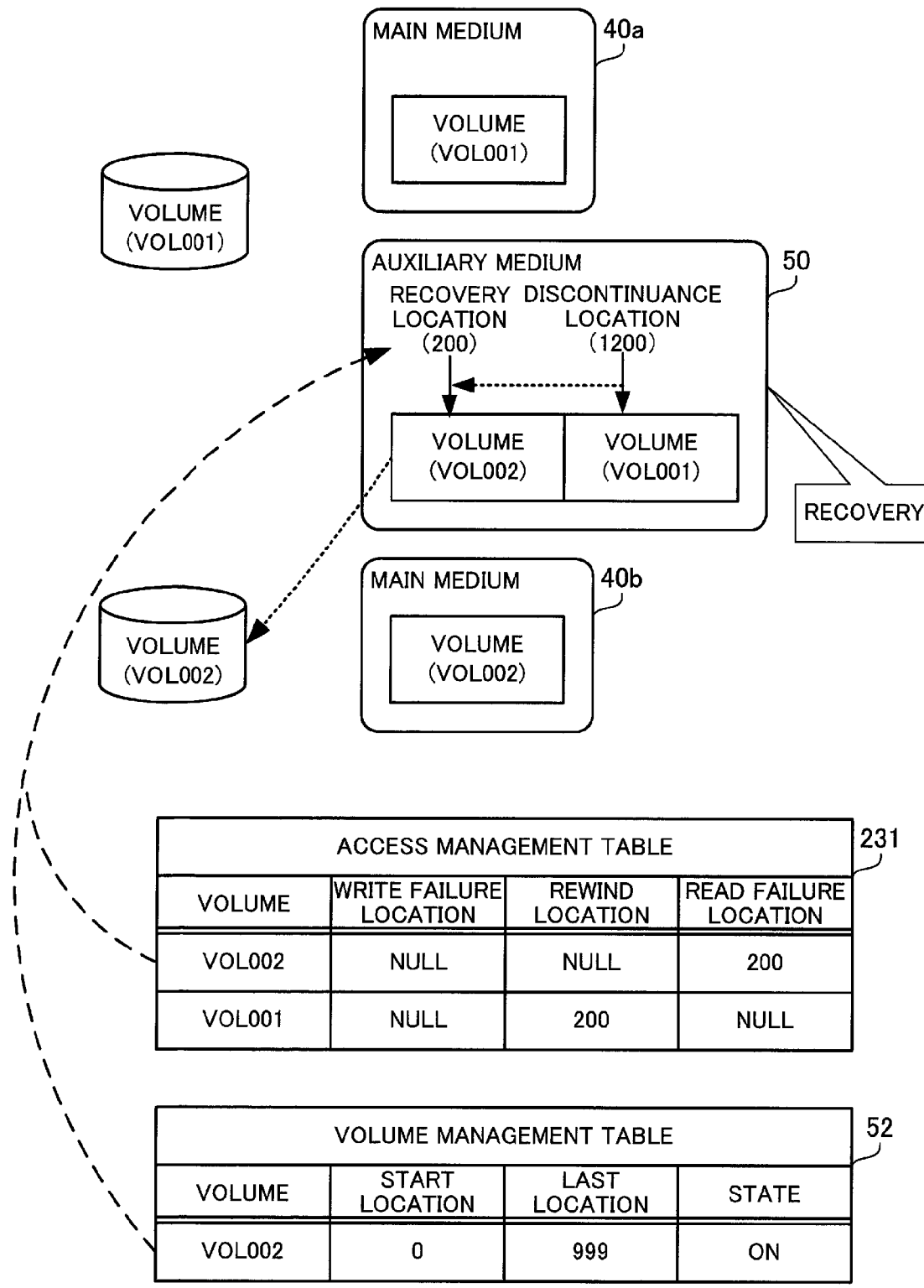
FIG. 16 illustrates an example of executing a backup job and a restore job in parallel (part 2)

FIG. 16 illustrates an example of executing the backup job and the restore job in parallel (part 2). The restore processor 262 moves an access location on the auxiliary medium 50 from a location at which the backup processor 261 discontinues writing (which may hereinafter be stated as a "discontinuance location") to a recovery location. The recovery location is calculated in the same way that is described in FIG. 13. As indicated in FIG. 16, a read failure location is "200" and a start location of a storage area of the volume "VOL002" on the auxiliary medium 50 is "0". Accordingly, the recovery location is "200". The restore processor 262 then recovers data from the calculated recovery location.

Figure 17:
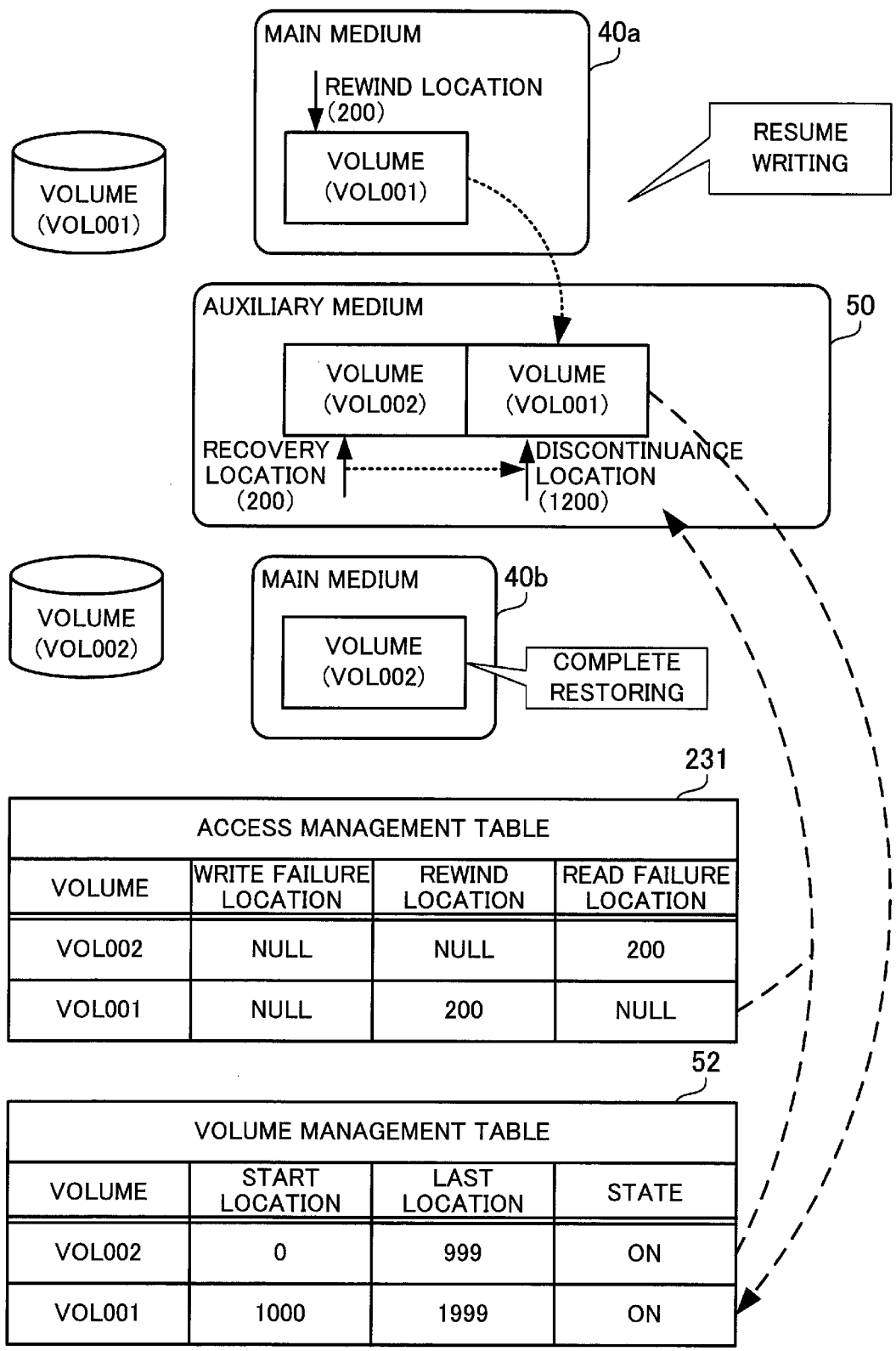
FIG. 17 illustrates an example of executing a backup job and a restore job in parallel (part 3)

FIG. 17 illustrates an example of executing the backup job and the restore job in parallel (part 3). When the recovery is completed (that is to say, when the use of the auxiliary medium 50 ends) in the restore job "VOL002", the backup processor 261 moves an access location on the auxiliary medium 50 from the recovery location to the discontinuance location.

A discontinuance location is calculated by adding a rewind location to a start location of a volume to be backed up. A start location of a volume to be backed up is a location next to a last location of data in a volume written onto the auxiliary medium 50 just before. In FIG. 17, the data in the volume "VOL002" is stored just before, so the discontinuance location is "999+1+200=1200".

The backup processor 261 then reads out the data in the volume "VOL001" from the rewind location on the main medium 40a and resumes writing it onto the auxiliary medium 50 from the discontinuance location.

In addition, the backup processor 261 registers volume management information regarding the volume "VOL001" in the volume management table 52. The volume management information regarding the volume "VOL001" at this time is as follows. A volume is "VOL001", a start location is "1000" which means a block next to the last location of the data stored just before, a last location is "1999" which means, in the case of the data in the volume "VOL001" corresponding to 1000 blocks, a 1000th block from the start location, and a state is "ON".

As described in FIGS. 15 through 17, when recovery is begun by a restore job while the auxiliary medium 50 is being written by a backup job, the backup processor 261 which is executing the backup job discontinues writing onto the auxiliary medium 50 until the recovery by the restore job ends. As a result, the restore job is executed preferentially.

Furthermore, in the above example, writing onto the auxiliary medium 50 from the discontinuance location in the backup job "VOL001" is realized by writing onto the auxiliary medium 50 the data read out from the rewind location on the main medium 40a. As a result, there is no need to hold, for example, in a storage area in the tape apparatus 200 all the remaining data in the volume "VOL001" to be written onto the auxiliary medium 50. Accordingly, storage capacity which the tape apparatus 200 has can be reduced.

An example of processing a backup job will now be described by the use of flow charts indicated in FIGS. 18 through 23. In FIGS. 18 through 23, it is assumed that a main medium 40a is mounted on the main medium drive 201a, that a main medium 40b is mounted on the main medium drive 201b, and that an auxiliary medium 50 is mounted on the auxiliary medium drive 202. In addition, in FIGS. 18 through 23, it is assumed that the main medium drive 201a is designated as a backup destination drive in a backup command.

Furthermore, in the following processes "auxiliary medium use information" is referred to. Auxiliary medium use information is used both in a backup job and in a restore job. An identifier of a volume which is written or read out in a job (backup job or a restore job) that is being executed by the use of an auxiliary medium is set in auxiliary medium use information. In addition, if an auxiliary medium is not used in a backup job or a restore job, then "NULL" is set in auxiliary medium use information. Auxiliary medium use information is stored, for example, in a storage area of the management information storage section 230.

Figure 18:
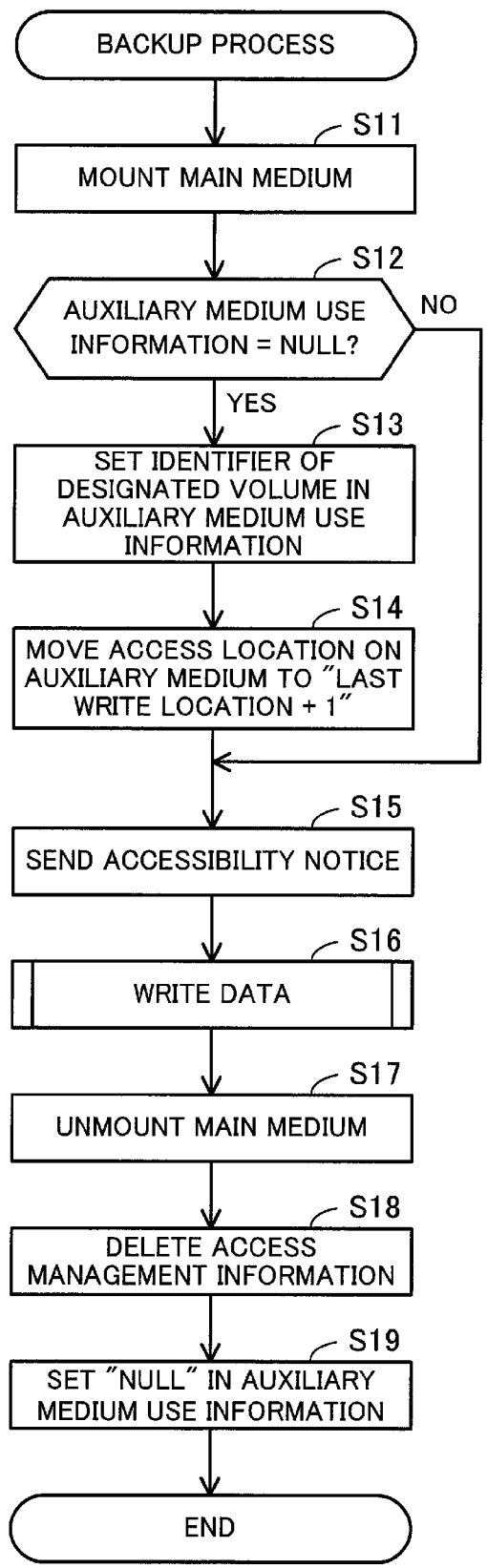
FIG. 18 is a flow chart of an example of a backup process.

FIG. 18 is a flow chart of an example of a backup process. The process described in FIG. 18 is performed when a backup command is received from the host apparatus 100. The backup command includes an identifier of a main medium drive, which is a backup destination of data, and an identifier of a backup source volume. Hereinafter a volume designated in a backup command or a restore command may be stated as a "designated volume".

The process indicated in FIG. 18 will now be described in order of step number.

(S11) The backup processor 261 mounts the main medium 40a on the main medium drive 201a designated in the backup command.

(S12) The backup processor 261 determines whether or not "NULL" is set in auxiliary medium use information. That is to say, the backup processor 261 determines whether or not the auxiliary medium 50 is used in another job.

If "NULL" is set in the auxiliary medium use information (if the auxiliary medium 50 is not used in another job), then the backup processor 261 proceeds to step S13. If "NULL" is not set in the auxiliary medium use information (if the auxiliary medium 50 is used in another job), then the backup processor 261 proceeds to step S15.

(S13) The backup processor 261 sets in the auxiliary medium use information an identifier of a designated volume designated in the backup command. As a result, the auxiliary medium 50 is not accessed in another job while the backup processor 261 is using the auxiliary medium 50 for executing its job.

(S14) The backup processor 261 moves an access location on the auxiliary medium 50 to "last write location+1". "last write location" means a last location of data written onto the auxiliary medium 50 just before. The last location of the data written onto the auxiliary medium 50 just before is obtained by referring to a last location included in the last record in the volume management table 52.

(S15) The backup processor 261 sends accessibility notice to the host apparatus 100 via the host input-output section 240.

(S16) The backup processor 261 writes data in the designated volume onto the main medium 40a and the auxiliary medium 50 via the tape input-output section 250. Details will be described in FIGS. 19 and 20.

(S17) The backup processor 261 unmounts the main medium 40a.

(S18) The backup processor 261 deletes from the access management table 231 access management information corresponding to the backup job. "access management information" means information regarding the state of access registered in the access management table 231. To be concrete, the backup processor 261 searches the access management table 231 for a record including the designated volume and deletes the record.

(S19) The backup processor 261 sets "NULL" in the auxiliary medium use information. This brings about a state in which the auxiliary medium 50 can be used in another job.

Figure 19:
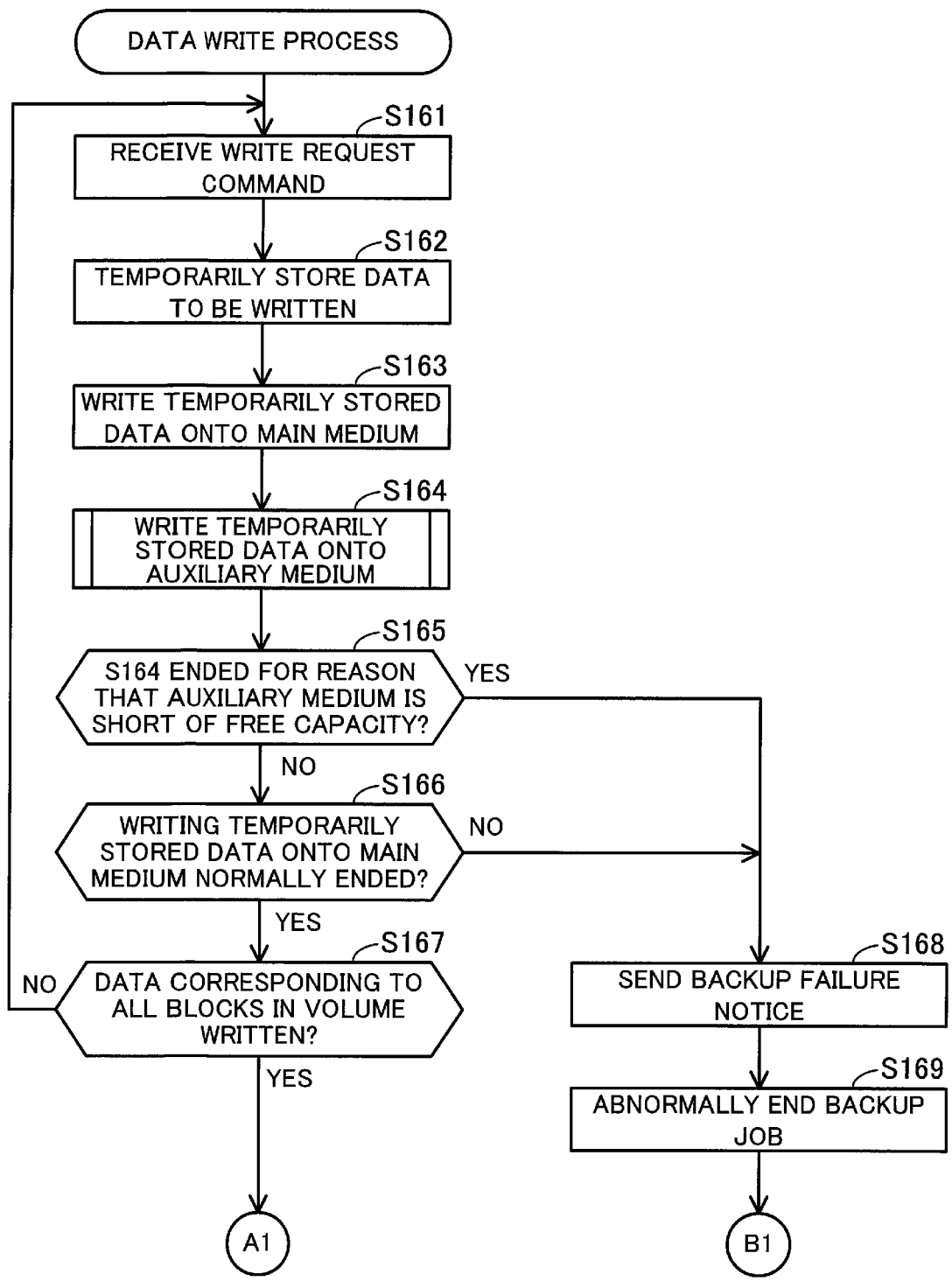
FIG. 19 is a flow chart of an example of a data write process (part 1)
Figure 20:
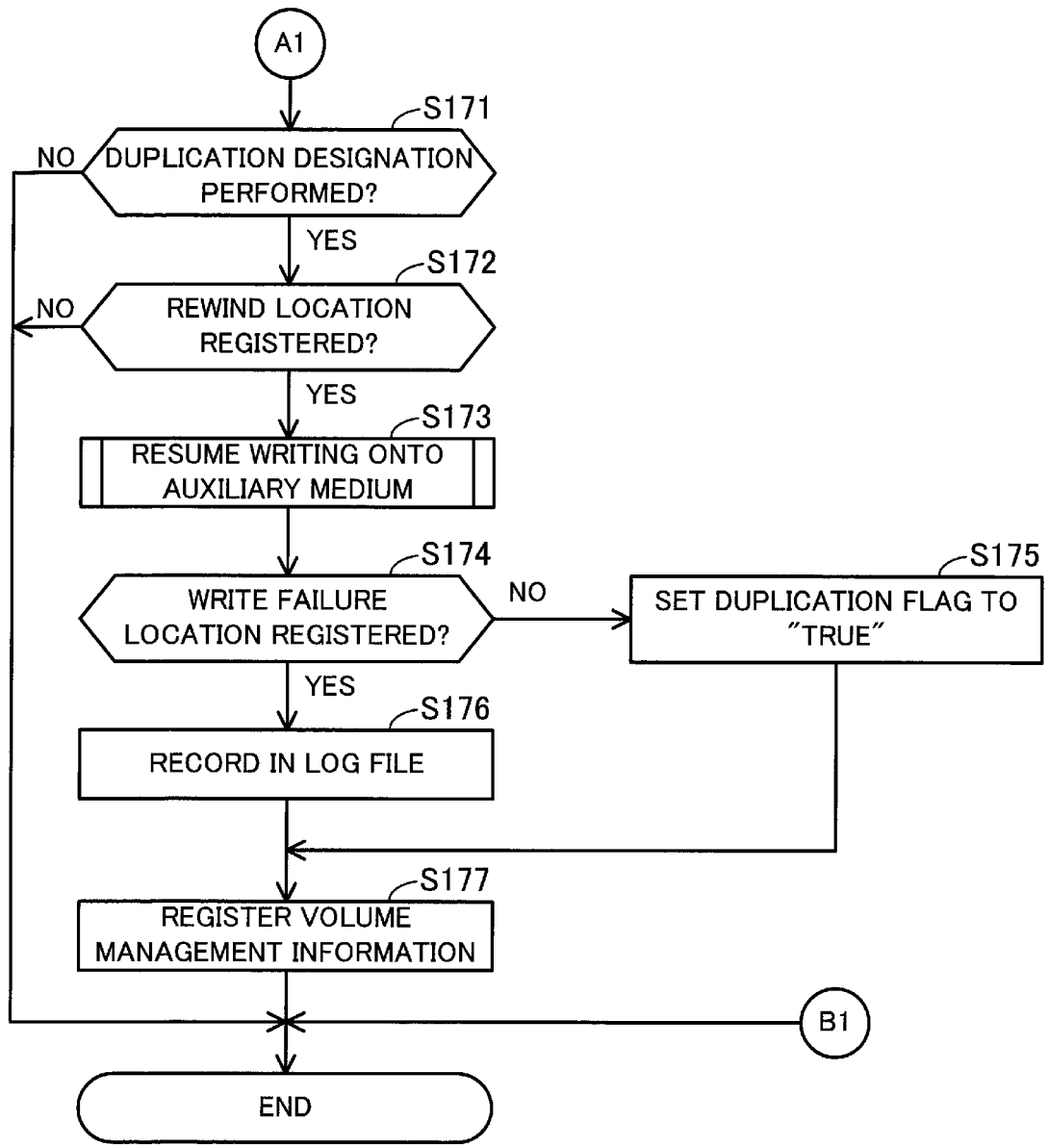
FIG. 20 is a flow chart of an example of a data write process (part 2)

FIG. 19 is a flow chart of an example of a data write process (part 1). A process indicated in FIGS. 19 and 20 is performed in the above step S16. The process indicated in FIGS. 19 and 20 will now be described in order of step number.

(S161) The backup processor 261 receives a write request command from the host apparatus 100 via the host input-output section 240. The write request command includes data corresponding to one block in a volume to be backed up. In addition, the write request command includes duplication designation information.

(S162) The backup processor 261 temporarily stores in the temporary data storage section 220 the data to be written included in the received write request command.

(S163) The backup processor 261 writes the temporarily stored data onto the main medium 40a via the tape input-output section 250.

(S164) The backup processor 261 writes the temporarily stored data onto the auxiliary medium 50. Details will be described in FIG. 21.

(S165) The backup processor 261 determines whether or not step S164 has ended for the reason that the auxiliary medium 50 is short of free capacity. If step S164 has ended for the reason that the auxiliary medium 50 is short of free capacity, then the backup processor 261 proceeds to step S168. If step S164 has not ended for the reason that there is sufficient free capacity on the auxiliary medium 50, then the backup processor 261 proceeds to step S166.

(S166) The backup processor 261 determines whether or not writing the temporarily stored data onto the main medium 40a has normally ended in step S163. If writing the temporarily stored data onto the main medium 40a has normally ended in step S163, then the backup processor 261 proceeds to step S167. If writing the temporarily stored data onto the main medium 40a has not normally ended in step S163, then the backup processor 261 proceeds to step S168.

(S167) The backup processor 261 determines whether or not data corresponding to all blocks in the volume has been written. If data corresponding to all the blocks in the volume has been written, then the backup processor 261 proceeds to step S171. If data corresponding to all the blocks in the volume has not been written, then the backup processor 261 proceeds to step S161. In the backup system 3, the number of blocks in each volume is stipulated in advance. For example, it is assumed that information indicative of the number of blocks in each volume is stored in advance in a storage area of the management information storage section 230.

The backup command may include information indicative of the number of blocks in each volume and the backup processor 261 may receive write request commands the number of which corresponds to the number of blocks in each volume.

(S168) The backup processor 261 sends backup failure notice to the host apparatus 100 via the host input-output section 240.

(S169) The backup processor 261 abnormally ends the backup job. The backup processor 261 then ends the process.

FIG. 20 is a flow chart of an example of the data write process (part 2).

(S171) The backup processor 261 determines whether or not duplication designation is performed in the write request command. To be concrete, the backup processor 261 determines whether or not the duplication designation information included in the write request command which the backup processor 261 receives in step S161 of FIG. 18 is set to "yes". If duplication designation is performed in the write request command, then the backup processor 261 proceeds to step S172. If duplication designation is not performed in the write request command, then the backup processor 261 ends the process.

(S172) The backup processor 261 determines whether or not a rewind location is registered in the access management table 231. That is to say, the backup processor 261 determines whether or not the backup processor 261 has discontinued writing onto the auxiliary medium 50.

To be concrete, first the backup processor 261 searches the access management table 231 for a record including the designated volume. If a record including the designated volume is found and a rewind location included in the record is not "NULL", then the backup processor 261 determines that a rewind location is registered. Cases where a rewind location is not "NULL" include a case where a rewind location is "0".

If a rewind location is registered in the access management table 231, then the backup processor 261 proceeds to step S173. If a rewind location is not registered in the access management table 231, then the backup processor 261 ends the process.

(S173) The backup processor 261 resumes writing onto the auxiliary medium 50. If the backup processor 261 does not write data onto the auxiliary medium 50 from the middle or head of the volume, the backup processor 261 resumes writing onto the auxiliary medium 50 after the backup processor 261 completes writing onto the main medium 40a. Details will be described in FIGS. 22 and 23.

Even if the backup processor 261 resumes writing onto the auxiliary medium 50 in step S173, the backup processor 261 may send backup job completion notice to the host apparatus 100 at any step after step S167 before step S173. In this case, the tape apparatus 200 writes remaining data onto the auxiliary medium 50 in the background. Though the tape apparatus 200 is writing the remaining data onto the auxiliary medium 50 in the background, the host apparatus 100 determines that the requested backup job is completed, and performs the next process. Otherwise the tape apparatus 200 may be in a wait state until writing onto the auxiliary medium 50 is resumed. That is to say, the influence of this wait state on operations using the host apparatus 100 is lessened.

(S174) The backup processor 261 determines whether or not a write failure location is registered in the access management table 231. That is to say, the backup processor 261 determines whether or not the backup processor 261 fails in writing onto the auxiliary medium 50 in step S164 or S173.

To be concrete, first the backup processor 261 searches the access management table 231 for a record including the designated volume. If a record including the designated volume is found and a write failure location included in the record is not "NULL", then the backup processor 261 determines that a write failure location is registered.

If a write failure location is registered in the access management table 231, then the backup processor 261 proceeds to step S176. If a write failure location is not registered in the access management table 231, then the backup processor 261 proceeds to step S175.

(S175) The backup processor 261 sets a duplication flag 42a of the main medium 40a to "TRUE".

(S176) The backup processor 261 records in a log file information such as information which is indicative that the backup processor 261 fails in writing onto the auxiliary medium 50 and information which is indicative of the write failure location. The host apparatus 100 can refer to the log file, so a manager or the like who operates the host apparatus 100 can recognize the state of backup by referring to the log file. Information indicative of the date and hour of the write failure may be recorded in the log file.

(S177) The backup processor 261 generates volume management information regarding a location to which the designated volume is written. At this time the backup processor 261 sets an identifier of the designated volume and "last write location+1" in the Volume and Start Location items, respectively, of volume management information. A last write location is obtained in the same way that is described in step S14 of FIG. 18.

In addition, if a write failure location is not registered in the access management table 231, then the backup processor 261 sets "start location+length of data in backup source volume−1" and "ON" in the Last Location and State items respectively. "length of data in backup source volume" is obtained by referring to the length of data in the volume included in the backup command.

If a write failure location is registered in the access management table 231, then the backup processor 261 sets information obtained by combining the write failure location and "(last)" and "ERR" in the Last Location and State items respectively.

The backup processor 261 registers the generated volume management information in the volume management table 52 for the auxiliary medium 50. If at this time a record including the designated volume is already stored in the volume management table 52, then the backup processor 261 changes a value set in the State item of the record to "OFF" to nullify data in the designated volume.

Figure 21:
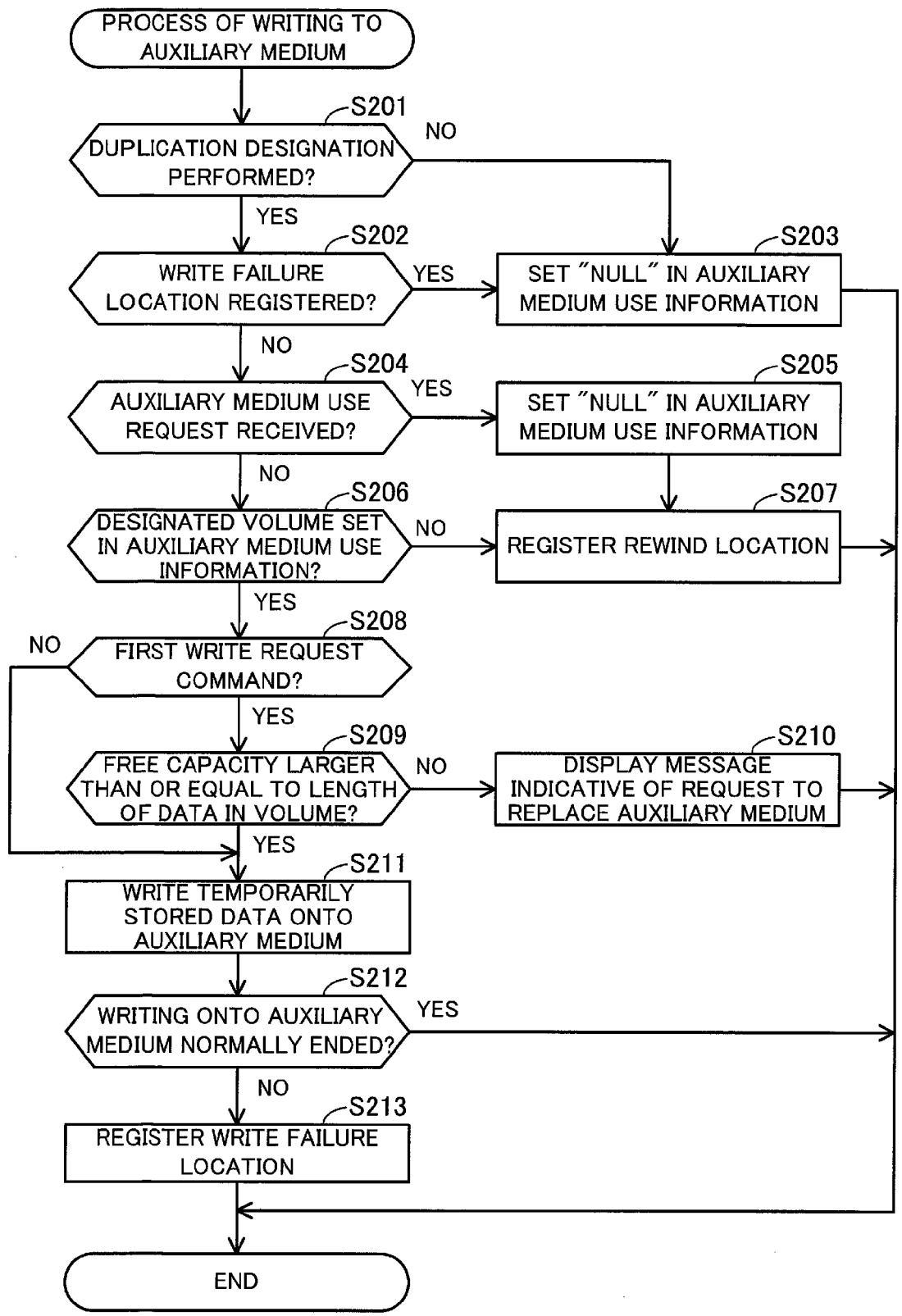
FIG. 21 is a flow chart of an example of the process of writing to an auxiliary medium.

FIG. 21 is a flow chart of an example of the process of writing to the auxiliary medium. The process indicated in FIG. 21 is performed in the above step S164. The process indicated in FIG. 21 will now be described in order of step number.

(S201) The backup processor 261 determines whether or not duplication designation is performed in the write request command. This is the same with step S171 of FIG. 20. If duplication designation is performed in the write request command, then the backup processor 261 proceeds to step S202. If duplication designation is not performed in the write request command, then the backup processor 261 proceeds to step S203.

(S202) The backup processor 261 determines whether or not a write failure location is registered in the access management table 231. That is to say, the backup processor 261 determines whether or not the backup processor 261 has already failed in writing onto the auxiliary medium 50 in the same backup job. Whether or not a write failure location is registered in the access management table 231 is determined in the same way that is described in step S174 of FIG. 20.

If a write failure location is registered in the access management table 231, then the backup processor 261 proceeds to step S203. If a write failure location is not registered in the access management table 231, then the backup processor 261 proceeds to step S204.

(S203) The backup processor 261 sets "NULL" in the auxiliary medium use information. This makes it possible to use the auxiliary medium 50 in another job.

(S204) The backup processor 261 determines whether or not the backup processor 261 has received an auxiliary medium use request from the restore processor 262 which is executing a restore job. If the backup processor 261 has received an auxiliary medium use request, then the backup processor 261 proceeds to step S205. If the backup processor 261 has not received an auxiliary medium use request, then the backup processor 261 proceeds to step S206.

(S205) The backup processor 261 sets "NULL" in the auxiliary medium use information. This is the same with step S203. This makes it possible to use the auxiliary medium 50 in the restore job.

(S206) The backup processor 261 determines whether or not the designated volume is set in the auxiliary medium use information. That is to say, the backup processor 261 determines whether or not the backup processor 261 is using the auxiliary medium 50 for executing its job.

If the designated volume is set in the auxiliary medium use information, then the backup processor 261 proceeds to step S208. If the designated volume is not set in the auxiliary medium use information, then the backup processor 261 proceeds to step S207.

(S207) The backup processor 261 registers a rewind location in the following way in the access management table 231.

First, if the backup processor 261 has received the auxiliary medium use request (YES in step S204), then the backup processor 261 determines that a rewind location is a write location on the main medium 40a at the time when the backup processor 261 received the auxiliary medium use request. If the auxiliary medium 50 is being used in another job (NO in step S206), then the backup processor 261 determines that a rewind location is "0". A case where the auxiliary medium 50 is being used in another job means a case where another backup job or a recovery process in a restore job has already begun at the beginning of its job.

Next, the backup processor 261 searches the access management table 231 for a record including the designated volume. If a rewind location is not yet registered in a found record, then the backup processor 261 registers the determined rewind location in this record. If a rewind location is already registered in a found record, then the backup processor 261 leaves the rewind location as it is. Whether or not a rewind location is registered is determined on the basis of whether "NULL" is set.

If a record including the designated volume is not found, then the backup processor 261 first generates a record in which the designated volume is set in the Volume item and in which "NULL" is set in the Write Failure Location and Read Failure Location items. The backup processor 261 then sets the determined rewind location in the Rewind Location item of the generated record. The backup processor 261 then registers the generated record in the access management table 231.

(S208) The backup processor 261 determines whether or not the received write request command is a first write request command after the starting of the job.

If the received write request command is a first write request command after the starting of the job, then the backup processor 261 proceeds to step S209. If the received write request command is a second or later write request command after the starting of the job, then the backup processor 261 proceeds to step S211.

(S209) The backup processor 261 determines whether or not free capacity of the auxiliary medium 50 is larger than or equal to the length of data in the volume. The free capacity of the auxiliary medium 50 is calculated by subtracting a last write location from all capacity of the auxiliary medium 50.

If the free capacity of the auxiliary medium 50 is larger than or equal to the length of the data in the volume, then the backup processor 261 proceeds to step S211. If the free capacity of the auxiliary medium 50 is smaller than the length of the data in the volume, then the backup processor 261 proceeds to step S210.

(S210) The backup processor 261 displays on the display 203 a message indicative of a request to replace the auxiliary medium 50.

(S211) The backup processor 261 writes the data temporarily stored in step S162 of FIG. 19 onto the auxiliary medium 50 via the tape input-output section 250.

(S212) The backup processor 261 determines whether or not writing onto the auxiliary medium 50 has normally ended. If writing onto the auxiliary medium 50 has normally ended, then the backup processor 261 ends the process. If writing onto the auxiliary medium 50 has not normally ended, then the backup processor 261 proceeds to step S213.

(S213) The backup processor 261 registers a write failure location in the following way in the access management table 231.

First the backup processor 261 searches the access management table 231 for a record including the designated volume. If a record including the designated volume is found, then a value set in the Write Failure Location item in the record is changed to a location at which the backup processor 261 fails in writing the data in step S211.

If a record including the designated volume is not found, then the backup processor 261 first generates a record in which the designated volume is set in the Volume item and in which "NULL" is set in the Rewind Location and Read Failure Location items. The backup processor 261 then sets the location at which the backup processor 261 fails in writing the data in step S211 in the Write Failure Location item of the generated record. The backup processor 261 then registers the generated record in the access management table 231.

Figure 22:
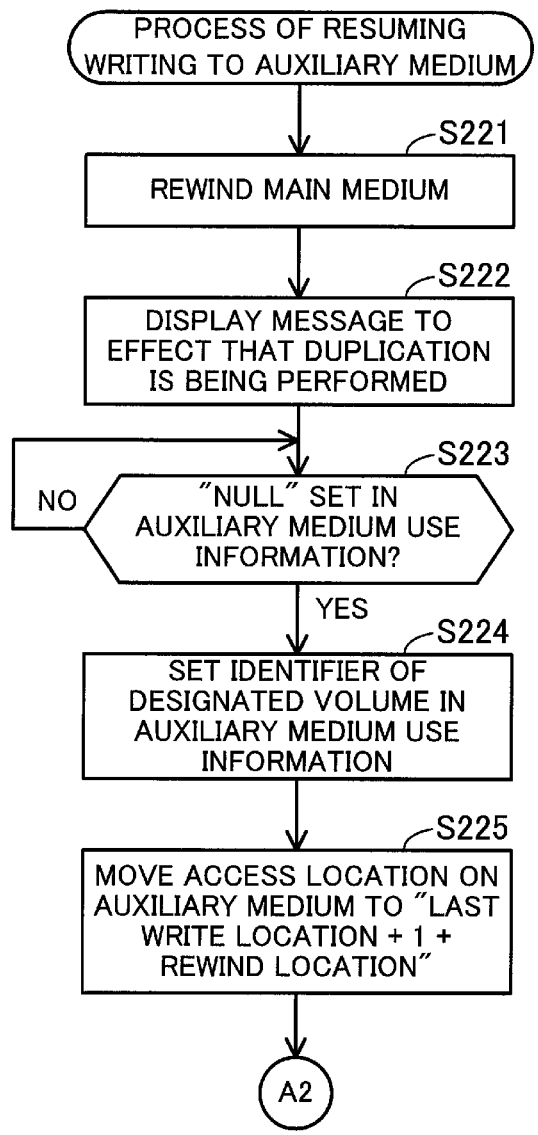
FIG. 22 is a flow chart of an example of the process of resuming writing to an auxiliary medium (part 1)
Figure 23:
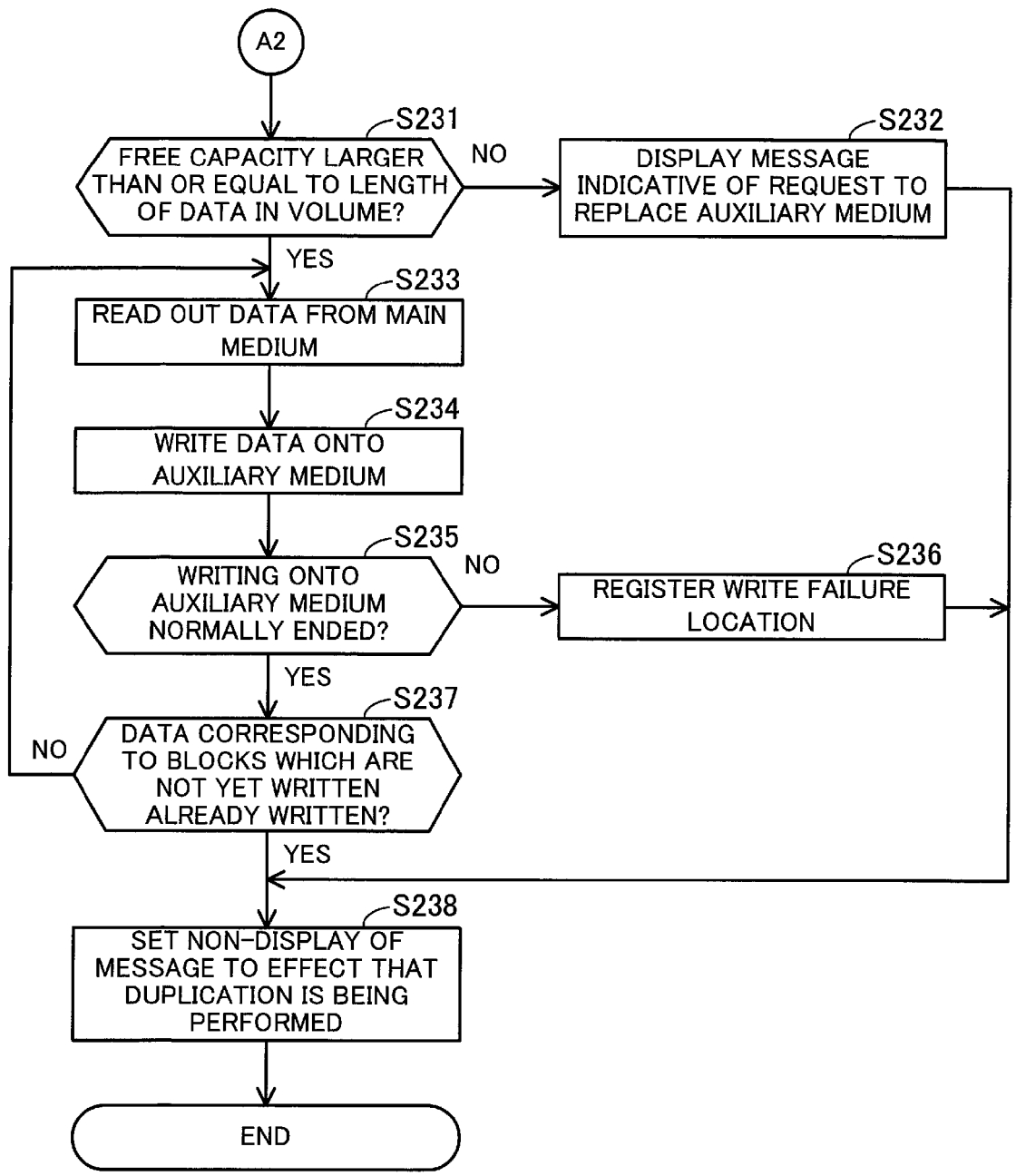
FIG. 23 is a flow chart of an example of the process of resuming writing to an auxiliary medium (part 2)

FIG. 22 is a flow chart of an example of the process of resuming writing to the auxiliary medium (part 1). The process indicated in FIGS. 22 and 23 is performed in the above step S173. The process indicated in FIGS. 22 and 23 will now be described in order of step number.

(S221) The backup processor 261 rewinds the main medium 40*a* to a rewind location. Information indicative of the rewind location is obtained by referring to the Rewind Location item in the record found in step S172 of FIG. 20.

If another backup job or a recovery process in a restore job has been begun at the time of the backup processor 261 beginning its job, then it is impossible for the backup processor 261 to write onto the auxiliary medium 50. In this case, the rewind location is the head of the main medium 40*a*. On the other hand, if a recovery process in a restore job is begun while the backup processor 261 is executing its job, then the rewind location is a location on the main medium 40*a* at the time of the backup processor 261 discontinuing writing onto the auxiliary medium 50.

(S222) The backup processor 261 displays on the display 203 a message to the effect that duplication is being performed.

(S223) The backup processor 261 determines whether or not "NULL" is set in the auxiliary medium use information. If "NULL" is set in the auxiliary medium use information (if the auxiliary medium 50 is not used in another job), then the backup processor 261 proceeds to step S224. If "NULL" is not set in the auxiliary medium use information (if the auxiliary medium 50 is used in another job), then the backup processor 261 proceeds to step S223.

That is to say, the backup processor 261 waits until the use of the auxiliary medium 50 ends in another job.

(S224) The backup processor 261 sets in the auxiliary medium use information an identifier of the designated volume related to its job. This makes it possible to recognize in another job that the auxiliary medium 50 is being used in its job.

(S225) The backup processor 261 moves an access location on the auxiliary medium 50 to "last write location+1+rewind location". Information indicative of the rewind location is obtained by referring to the Rewind Location item in the record found in step S172 of FIG. 20.

FIG. 23 is a flow chart of an example of the process of resuming writing to the auxiliary medium (part 2).

(S231) The backup processor 261 determines whether or not free capacity of the auxiliary medium 50 is larger than or equal to the length of data in the volume. This is the same with step S209 of FIG. 21.

If the free capacity of the auxiliary medium 50 is larger than or equal to the length of the data in the volume, then the backup processor 261 proceeds to step S233. If the free capacity of the auxiliary medium 50 is smaller than the length of the data in the volume, then the backup processor 261 proceeds to step S232.

(S232) The backup processor 261 displays on the display 203 a message indicative of a request to replace the auxiliary medium 50.

(S233) The backup processor 261 reads out data corresponding to one block from the main medium 40*a* via the tape input-output section 250 and temporarily stores the data read out in the temporary data storage section 220.

(S234) The backup processor 261 writes the temporarily stored data onto the auxiliary medium 50.

(S235) The backup processor 261 determines whether or not writing onto the auxiliary medium 50 has normally ended.

If writing onto the auxiliary medium 50 has normally ended, then the backup processor 261 proceeds to step S237.

If writing onto the auxiliary medium 50 has not normally ended, then the backup processor 261 proceeds to step S236. In this case, the tape input-output section 250 informs the backup processor 261 about information indicative of a location at which writing onto the auxiliary medium 50 has failed.

(S236) The backup processor 261 registers the write failure location in the access management table 231 in the same way that is described in step S213 of FIG. 21.

(S237) The backup processor 261 determines whether or not data corresponding to blocks which are not yet written has been written. If the backup processor 261 discontinues the write process because it receives the auxiliary medium use request (YES in step S204), then the number of the blocks which are not yet written is the number of remaining blocks. If the backup processor 261 discontinues the write process because the auxiliary medium 50 is being used in another job (NO in step S204), then the number of the blocks which are not yet written is the number of blocks in a volume stipulated in advance.

If the data corresponding to the blocks which are not yet written has been written, then the backup processor 261 proceeds to step S238. If the data corresponding to the blocks which are not yet written has not been written, then the backup processor 261 proceeds to step S233.

(S238) The backup processor 261 sets on the display 203 non-display of a message to the effect that duplication is being performed.

Restore job processing will now be described by the use of flow charts indicated in FIGS. 24 through 27. In FIGS. 24 through 27, it is assumed that a main medium 40*a* is mounted on the main medium drive 201*a*, that a main medium 40*b* is mounted on the main medium drive 201*b*, and that an auxiliary medium 50 is mounted on the auxiliary medium drive 202. In addition, in FIGS. 24 through 27, it is assumed that the main medium drive 201*a* is designated as a restore source drive in a restore command.

Figure 24:
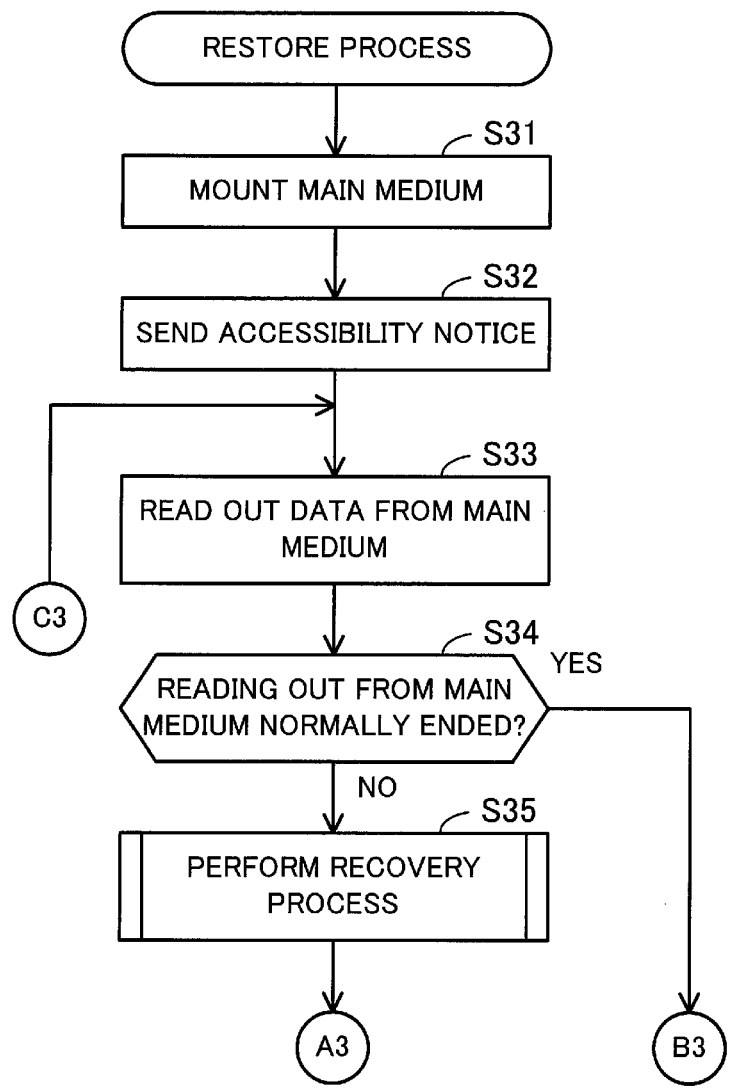
FIG. 24 is a flow chart of an example of a restore process (part 1)
Figure 25:
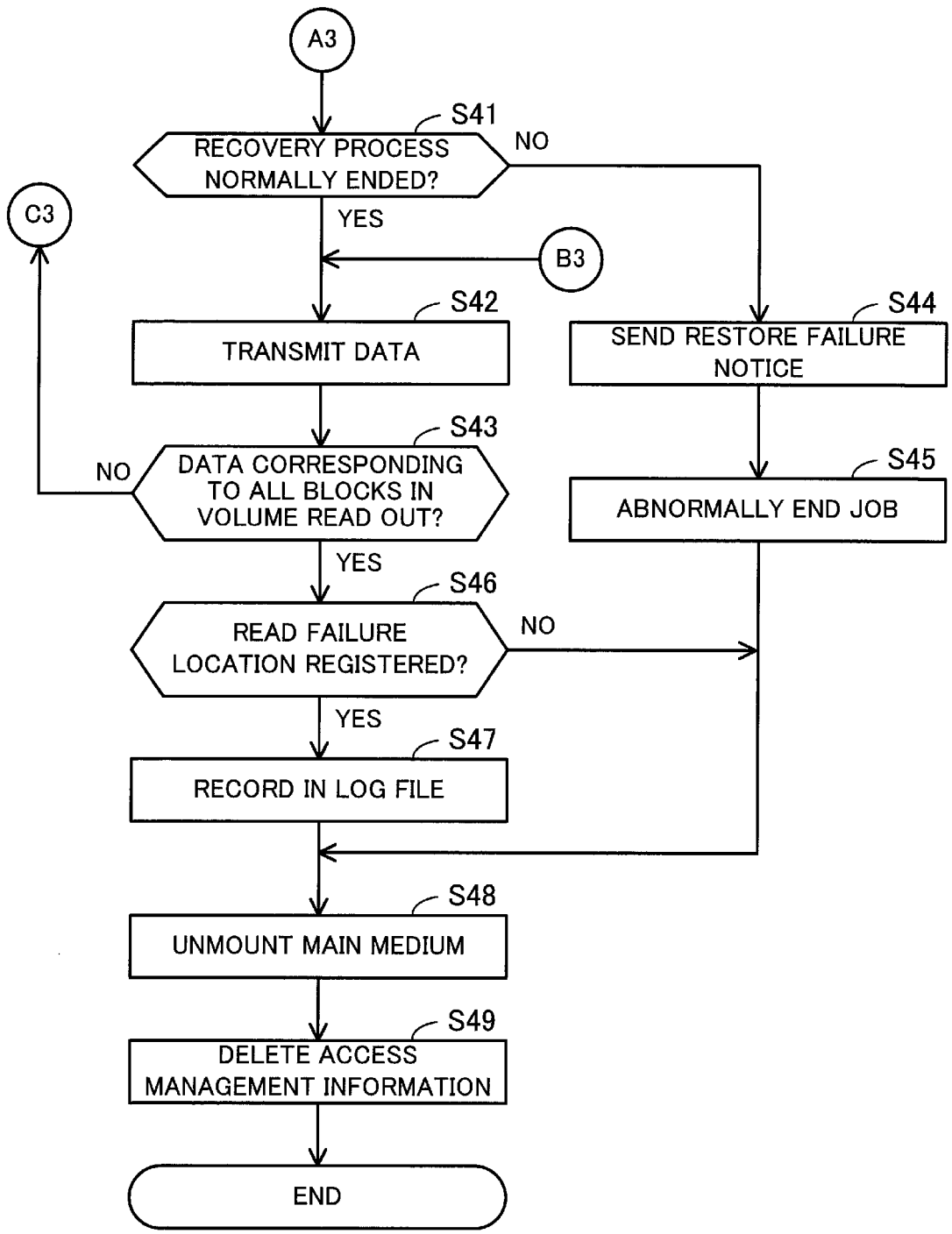
FIG. 25 is a flow chart of an example of a restore process (part 2)

FIG. 24 is a flow chart of an example of a restore process (part 1). The process described in FIGS. 24 and 25 is performed when a restore command is received from the host apparatus 100. The restore command includes an identifier of a main medium drive, which is a restore source of data, and an identifier of a restore destination volume. The process indicated in FIGS. 24 and 25 will now be described in order of step number.

(S31) The restore processor 262 mounts the main medium 40*a* on the main medium drive 201*a* designated in the restore command. Furthermore, the restore processor 262 requests the main medium drive 201*a* to rewind the main medium 40*a* mounted thereon to the head.

(S32) The restore processor 262 sends accessibility notice to the host apparatus 100 via the host input-output section 240.

(S33) The restore processor 262 receives a read request command from the host apparatus 100 via the host input-output section 240. The read request command includes information indicative of data corresponding to one block in a volume to be restored. The restore processor 262 reads out the data designated in the read request command from the main medium 40*a* via the tape input-output section 250 and temporarily stores the data read out in the temporary data storage section 220.

(S34) The restore processor 262 determines whether or not reading out the data from the main medium 40*a* has normally ended. If reading out the data from the main medium 40a has normally ended, then the restore processor 262 proceeds to step S42.

If reading out the data from the main medium 40a has not normally ended, then the restore processor 262 proceeds to step S35. In this case, the tape input-output section 250 informs the restore processor 262 about information indicative of a location at which reading out the data from the main medium 40a has failed.

(S35) The restore processor 262 performs the process of recovering from the auxiliary medium 50. Details will be described in FIGS. 26 and 27.

FIG. 25 is a flow chart of an example of a restore process (part 2).

(S41) The restore processor 262 determines whether or not the recovery process which it performs in step S35 of FIG. 24 has normally ended. If the recovery process which the restore processor 262 performs in step S35 of FIG. 24 has normally ended, then the restore processor 262 proceeds to step S42. If the recovery process which the restore processor 262 performs in step S35 of FIG. 24 has not normally ended, then the restore processor 262 proceeds to step S44.

(S42) The restore processor 262 transmits the data temporarily stored in step S33 of FIG. 24 to the host apparatus 100 via the host input-output section 240.

(S43) The restore processor 262 determines whether or not data corresponding to all blocks in the volume to be restored has been read out. If the data corresponding to all the blocks in the volume to be restored has been read out, then the restore processor 262 proceeds to step S46. If there is data which is not yet read out, then the restore processor 262 proceeds to step S33 of FIG. 24.

(S44) The restore processor 262 sends restore failure notice to the host apparatus 100 via the host input-output section 240.

(S45) The restore processor 262 abnormally ends the restore job.

(S46) The restore processor 262 determines whether or not a read failure location is registered in the access management table 231. That is to say, the restore processor 262 determines whether or not a failure in reading out from the main medium 40a has occurred during the restore.

To be concrete, first the restore processor 262 searches the access management table 231 for a record including the designated volume. If a record including the designated volume is found and a read failure location included in the record is not "NULL", then the restore processor 262 determines that a read failure location is registered.

If a read failure location is registered in the access management table 231, then the restore processor 262 proceeds to step S47. If a read failure location is not registered in the access management table 231, then the restore processor 262 proceeds to step S48.

(S47) The restore processor 262 records in a log file information regarding the failure in reading out from the main medium 40a. The information regarding the failure in reading out from the main medium 40a includes information indicative of the fact of the failure in reading out from the main medium 40a, information indicative of the read failure location, and the like.

(S48) The restore processor 262 unmounts the main medium 40a.

(S49) The restore processor 262 deletes access management information from the access management table 231. This is the same with step S18 of FIG. 18.

Figure 26:
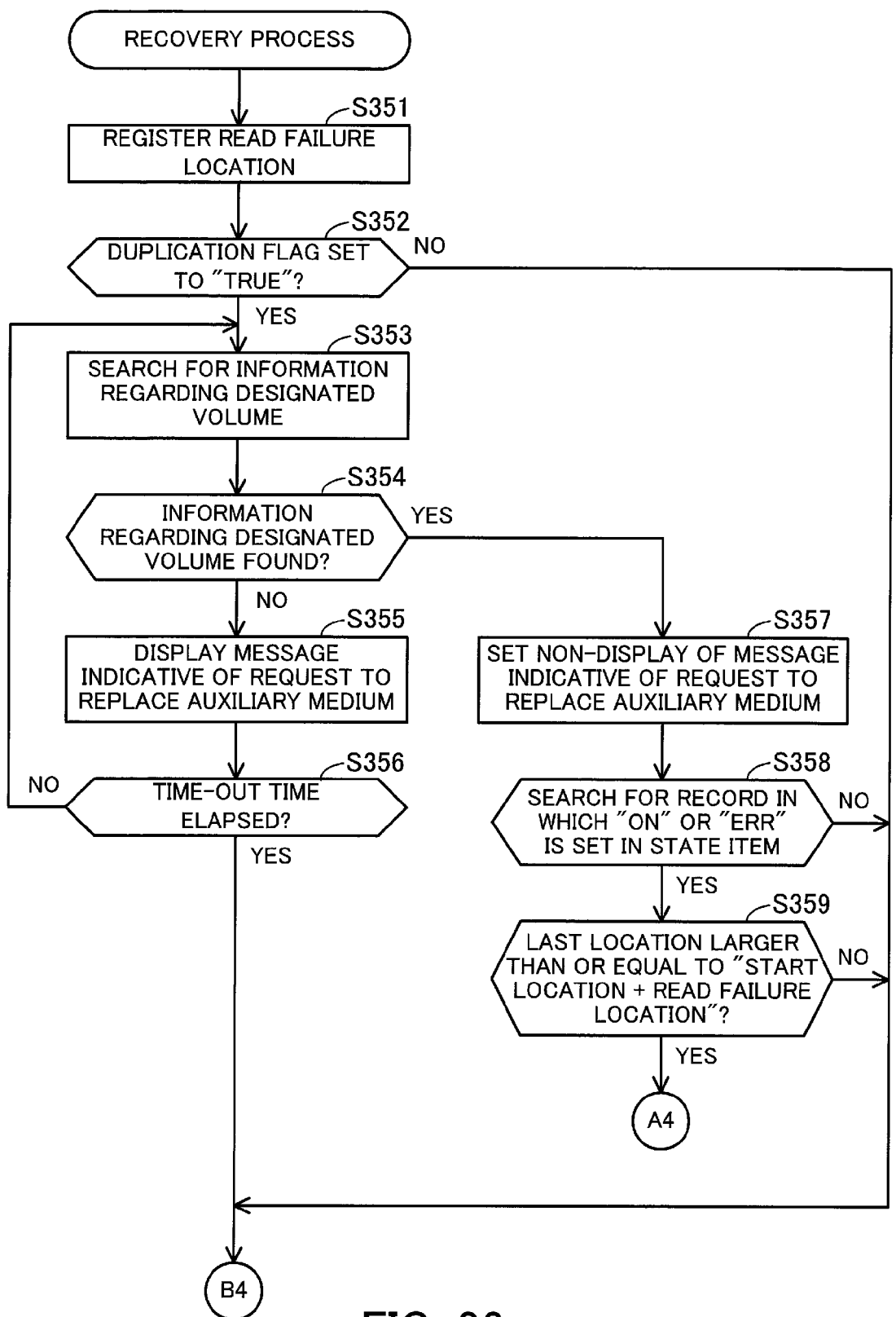
FIG. 26 is a flow chart of an example of a recovery process (part 1)
Figure 27:
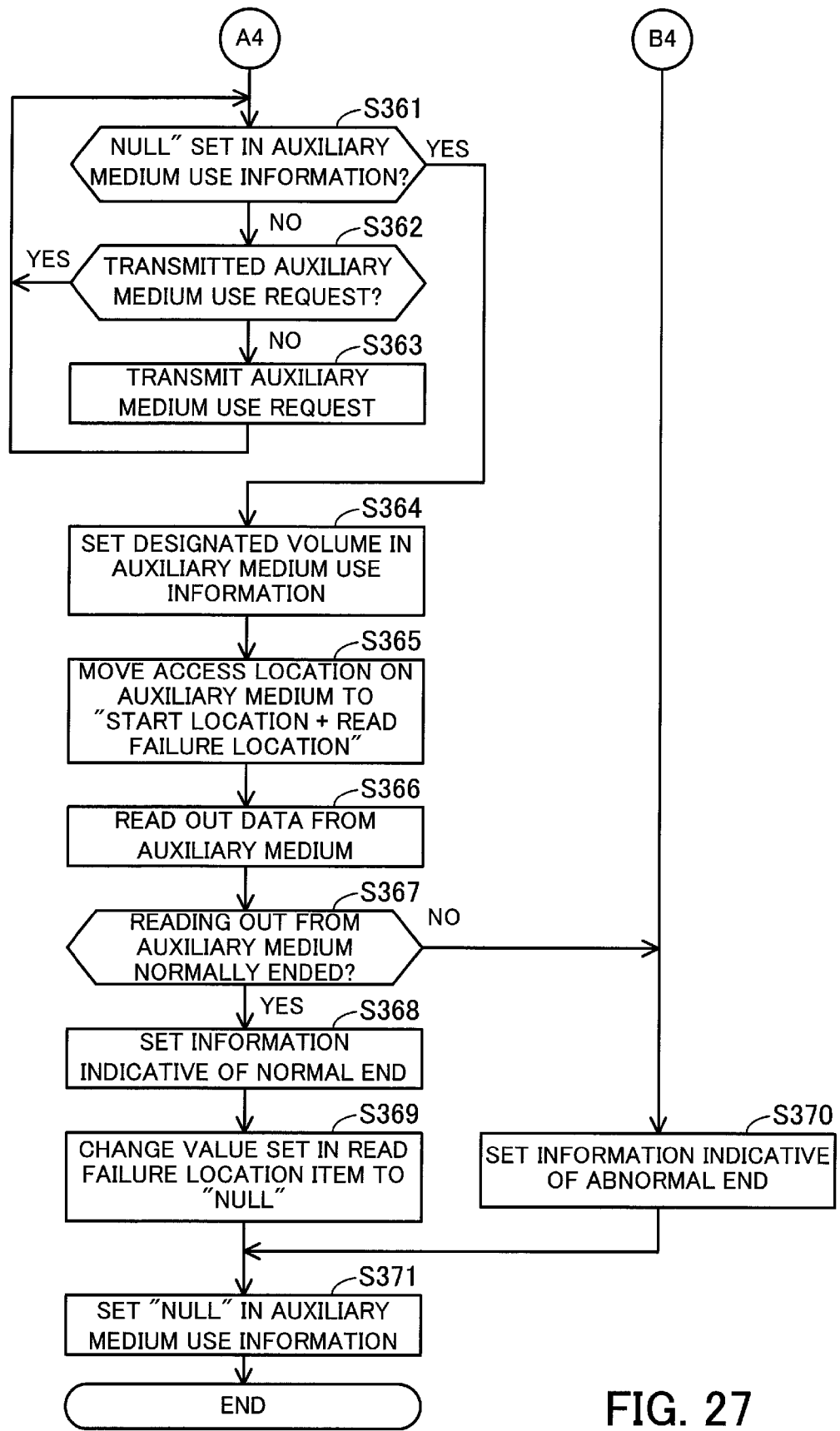
FIG. 27 is a flow chart of an example of a recovery process (part 2).

FIG. 26 is a flow chart of an example of the recovery process (part 1). The process indicated in FIGS. 26 and 27 is performed in the above step S35. The process indicated in FIGS. 26 and 27 will now be described in order of step number.

(S351) The restore processor 262 registers the read failure location in the access management table 231 in the following way.

First the restore processor 262 searches the access management table 231 for a record including the designated volume. If a record including the designated volume is found and a read failure location is not yet registered in the record, then the restore processor 262 sets in the record the read failure location about which the tape input-output section 250 informs the restore processor 262 in step S34 of FIG. 24.

If a record including the designated volume is not found, the restore processor 262 first generates a record in which the designated volume is set in the Volume item and in which "NULL" is set in the Rewind Location and Write Failure Location items. The restore processor 262 then sets in the Read Failure Location item of the generated record the read failure location about which the tape input-output section 250 informs the restore processor 262 in step S34 of FIG. 24. The restore processor 262 then stores the generated record in the access management table 231.

(S352) The restore processor 262 determines whether or not a duplication flag 42a of the main medium 40a is set to "TRUE". If the duplication flag 42a of the main medium 40a is set to "TRUE", then the restore processor 262 proceeds to step S353. If the duplication flag 42a of the main medium 40a is set to "FALSE", then the restore processor 262 proceeds to step S370.

(S353) The restore processor 262 searches a volume management table 52 of the auxiliary medium 50 currently mounted on the auxiliary medium drive 202 for a record including the designated volume.

(S354) The restore processor 262 determines whether or not a record including the designated volume is found in step S353. That is to say, the restore processor 262 determines whether or not there is data in the designated volume on the auxiliary medium 50.

If a record including the designated volume is found, then the restore processor 262 proceeds to step S357. If a record including the designated volume is not found, then the restore processor 262 proceeds to step S355. If an auxiliary medium mounted on the auxiliary medium drive 202 is replaced after the determination of "NO" is made the first time in step S354, then the determination of "YES" is made the second and later times.

(S355) The restore processor 262 displays on the display 203 a message indicative of a request to replace the auxiliary medium.

(S356) The restore processor 262 determines whether or not time-out time has elapsed after it displays the message in step S355. Information indicative of the time-out time is stored, for example, in the management information storage section 230. If the time-out time has elapsed after the restore processor 262 displays the message in step S355, then the restore processor 262 proceeds to step S370. If the time-out time has not elapsed after the restore processor 262 displays the message in step S355, then the restore processor 262 proceeds to step S353. In this case, steps S353 through S356 are repeated every constant time until the time-out time elapses.

(S357) The restore processor 262 sets on the display 203 non-display of a message indicative of a request to replace the auxiliary medium.

(S358) The restore processor 262 searches for a record, of records found in step S353, in which "ON" or "ERR" is set in the State item. If a record in which "ON" or "ERR" is set in the State item is found, then the restore processor 262 proceeds to step S359. If a record in which "ON" or "ERR" is set in the State item is not found, then the restore processor 262 proceeds to step S370.

(S359) The restore processor 262 determines whether or not a last location is larger than or equal to "start location+ read failure location". "start location" and "last location" are obtained by referring to the Start Location and Last Location items in the record found in step S358. The read failure location registered in step S351 is used as "read failure location".

If the last location is larger than or equal to "start location+ read failure location", then the restore processor 262 proceeds to step S361. If the last location is smaller than "start location+read failure location", then the restore processor 262 proceeds to step S370.

FIG. 27 is a flow chart of an example of a recovery process (part 2).

(S361) The restore processor 262 determines whether or not "NULL" is set in auxiliary medium use information. If "NULL" is set in the auxiliary medium use information (if the mounted auxiliary medium 50 is not used in another job), then the restore processor 262 proceeds to step S364. If "NULL" is not set in the auxiliary medium use information (if the mounted auxiliary medium 50 is used in another job), then the restore processor 262 proceeds to step S362.

(S362) The restore processor 262 determines whether or not it has transmitted an auxiliary medium use request. If the restore processor 262 has transmitted an auxiliary medium use request, then the restore processor 262 proceeds to step S361. If the restore processor 262 has not transmitted an auxiliary medium use request yet, then the restore processor 262 proceeds to step S363.

(S363) The restore processor 262 transmits an auxiliary medium use request. A volume set in the auxiliary medium use information which the restore processor 262 refers to in step S361 is being written or read out in a job in which the auxiliary medium 50 is being used. By transmitting the auxiliary medium use request, using the auxiliary medium 50 is discontinued in the job in which the auxiliary medium 50 is being used, and "NULL" is set in the auxiliary medium use information. As a result, the auxiliary medium 50 can be used.

The restore processor 262 repeats steps S361 and S362 until "NULL" is set in the auxiliary medium use information (that is to say, until a state in which the mounted auxiliary medium 50 is not used in another job arises).

(S364) The restore processor 262 sets in the auxiliary medium use information the designated volume related to its job. This prevents the use of the auxiliary medium 50 in another job during the recovery.

(S365) The restore processor 262 moves an access location on the auxiliary medium 50 to "start location+read failure location". "start location" is obtained by referring to the Start Location item in the record found in step S358 of FIG. 26.

(S366) The restore processor 262 reads out data from the auxiliary medium 50 and temporarily stores the data read out in the temporary data storage section 220.

(S367) The restore processor 262 determines whether or not reading out from the auxiliary medium 50 has normally ended. If reading out from the auxiliary medium 50 has normally ended, then the restore processor 262 proceeds to step S368. If reading out from the auxiliary medium 50 has not normally ended, then the restore processor 262 proceeds to step S370.

(S368) The restore processor 262 set information indicative of a normal end in information indicative of a result obtained by performing the recovery process (process described in FIGS. 26 and 27). The information indicative of the result obtained by performing the recovery process is stored, for example, in the management information storage section 230.

(S369) The restore processor 262 brings about a state in which the read failure location registered in step S351 is not yet registered. To be concrete, the restore processor 262 searches the access management table 231 for a record including the designated volume, and changes a value set in the Read Failure Location item of a record found to "NULL".

(S370) The restore processor 262 set information indicative of an abnormal end in information indicative of a result obtained by performing the recovery process.

(S371) The restore processor 262 sets "NULL" in the auxiliary medium use information. As a result, the auxiliary medium 50 can be used in another job.

According to the second embodiment, each time the tape apparatus 200 receives from the host apparatus 100 a backup command which gives instructions to back up a volume, the tape apparatus 200 writes data in the volume onto a corresponding main medium and adds the same data onto the auxiliary medium 50. As a result, a duplicate of data stored on each of a plurality of main media is stored in block on the auxiliary medium 50. This decreases the number of record media on which backup data is saved. Furthermore, by storing in block on the auxiliary medium 50 a duplicate of data stored on each of a plurality of main media, a storage area of the auxiliary medium 50 is effectively utilized. In addition, backup data is written onto a main medium and the auxiliary medium 50 by one backup command, so a backup operation is efficiently performed by the host apparatus 100.

Moreover, while data is being written onto the auxiliary medium 50 in one backup job, a second backup job may be started. In this case, after writing the data onto the auxiliary medium 50 in the one backup job ends, data is written onto the auxiliary medium 50 in the second backup job. As a result, when plural backup jobs have been started, exclusive control is exercised over the auxiliary medium 50.

Furthermore, if the tape apparatus 200 fails in reading out data from a main medium at the time of executing a restore job, the tape apparatus 200 acquires from the auxiliary medium 50 data corresponding to the data which the tape apparatus 200 fails in reading out from the main medium, and transmits the acquired data to the host apparatus 100. As a result, when the host apparatus 100 fails in restoring from the main medium, there is no need for the host apparatus 100 to make again a request to restore from the auxiliary medium 50. That is to say, if a restore command is issued once, a recovery process is automatically performed when reading out from a main medium fails. Accordingly, restore is efficiently performed regardless of whether or not reading out from a main medium succeeds.

In addition, if the restore processor 262 fails in reading out from a main medium in a restore job while the backup processor 261 is writing data onto the auxiliary medium 50 in a backup job, then the restore processor 262 which is executing the restore job transmits an auxiliary medium use request to make the backup processor 261 discontinue writing the data onto the auxiliary medium 50 in the backup job, and performs the process of recovering from the auxiliary medium 50. As a result, when the restore processor 262 reads out data corresponding to, at the most, one block from the auxiliary medium 50 at recovery time, there is no need for the restore processor 262 to wait for the backup processor 261 to write data corresponding to more than one block in the backup job. Accordingly, recovery is performed efficiently. Moreover, restore is performed in the case of an abnormality occurring in a backup source volume, so it is very urgent. By performing the above process, a restore job is preferentially executed even when a backup job is being executed.

In addition, after the tape apparatus 200 writes data onto the auxiliary medium 50, the tape apparatus 200 stores in the volume management table 52 information regarding a location to which the tape apparatus 200 writes the data. At recovery time the data to be recovered is acquired from the auxiliary medium 50 on the basis of the stored information. As a result, data to be recovered is efficiently acquired from the auxiliary medium 50 on which duplicates of data stored on a plurality of main media are stored in block.

As stated above, information processing in the first embodiment is realized by making the tape apparatus 10 execute a program. Information processing in the second embodiment is realized by making the host apparatus 100 and the tape apparatus 200 execute programs. Each of these programs is recorded on a computer-readable record medium (record medium 33, for example). A magnetic disk, an optical disk, a magneto-optical disk, a semiconductor memory, or the like is used as a record medium. A magnetic disk may be a FD or a HDD. An optical disk may be a CD, a CD-R(Recordable)/RW(ReWritable), a DVD, or a DVD-R/RW.

In order to circulate the programs, portable record media or the like on which the programs are recorded are provided. A computer stores in a storage device (flash memory 213, for example) the programs recorded on portable record media, the programs received from another computer, or the like, reads the programs from the storage device, and executes the programs. However, the computer may directly execute the programs read from the portable record media. Furthermore, at least a part of the above information processing may be realized by an electronic circuit such as a DSP (Digital Signal Processor), an ASIC, or a PLD (Programmable Logic Device).

According to an aspect, an increase in the number of magnetic tapes used for backup is checked.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A tape apparatus comprising:
a plurality of tape drives; and
a controller which controls reading from and writing onto magnetic tapes by the use of the plurality of tape drives, wherein:
when the controller receives a request to write first data, the controller writes the first data both onto a first main data magnetic tape and onto an auxiliary data magnetic tape; and
when the controller receives a request to write second data after the request to write the first data, the controller writes the second data onto a second main data magnetic tape and adds the second data onto the auxiliary data magnetic tape.

2. The tape apparatus according to claim 1, wherein when the controller receives the request to write the second data while the controller is writing the first data onto the first main data magnetic tape and the auxiliary data magnetic tape, the controller writes the second data onto the second main data magnetic tape, and discontinues writing the second data onto the auxiliary data magnetic tape until the controller completes writing the first data onto the auxiliary data magnetic tape.

3. The tape apparatus according to claim 2, wherein after the controller completes writing the second data onto the second main data magnetic tape and completes writing the first data onto the auxiliary data magnetic tape, the controller reads out the second data from the second main data magnetic tape and adds the second data onto the auxiliary data magnetic tape.

4. The tape apparatus according to claim 1, wherein:
when the controller receives a request to read out the first data after completing writing the first data onto the first main data magnetic tape and the auxiliary data magnetic tape, the controller reads out the first data from the first main data magnetic tape; and
when the controller fails in reading out the first data from the first main data magnetic tape, the controller reads out from the auxiliary data magnetic tape data corresponding to a location at which reading out the first data fails.

5. The tape apparatus according to claim 4, wherein when the controller performs in parallel a write process for writing the second data onto the second main data magnetic tape and the auxiliary data magnetic tape and a read process for reading out the first data from the first main data magnetic tape in response to the request to read out the first data and fails in reading out the first data from the first main data magnetic tape, the controller reads out from the auxiliary data magnetic tape the data, of the first data, corresponding to a location at which the controller fails in reading out, and discontinues writing the second data onto the auxiliary data magnetic tape until the controller completes reading out the first data from the auxiliary data magnetic tape.

6. The tape apparatus according to claim 5, wherein when the controller fails in reading out the first data from the first main data magnetic tape, the controller:
discontinues writing the second data onto the auxiliary data magnetic tape;
continues writing the second data onto the second main data magnetic tape; and
reads out from the second main data magnetic tape remaining data, of the second data, which is not written onto the auxiliary data magnetic tape and adds the remaining data onto the auxiliary data magnetic tape after the controller completes writing the second data onto the second main data magnetic tape and completes reading out from the auxiliary data magnetic tape the data, of the first data, corresponding to the location at which the controller fails in reading out.

7. A storage control apparatus for controlling reading data from and writing data onto magnetic tapes, the apparatus comprising:
a receiving section which receives a data write request; and
a control section which writes, when the receiving section receives a request to write first data, the first data both onto a first main data magnetic tape and onto an auxiliary data magnetic tape and which writes, when the receiving section receives a request to write second data after the request to write the first data, the second data onto a second main data magnetic tape and adds the second data onto the auxiliary data magnetic tape.

8. A storage control method for controlling reading data from and writing data onto magnetic tapes, the method comprising:

writing, at the time of receiving a request to write first data, the first data both onto a first main data magnetic tape and onto an auxiliary data magnetic tape; and writing, at the time of receiving a request to write second data after the request to write the first data, the second data onto a second main data magnetic tape and adding the second data next to the first data on the auxiliary data magnetic tape.

9. The storage control method according to claim 8, further comprising writing, at the time of receiving during writing the first data the request to write the second data, the second data onto the second main data magnetic tape and discontinuing writing the second data onto the auxiliary data magnetic tape until completing writing the first data onto the auxiliary data magnetic tape.

10. The storage control method according to claim 9, further comprising reading out, after completing writing the second data onto the second main data magnetic tape and completing writing the first data onto the auxiliary data magnetic tape, the second data from the second main data magnetic tape and adding the second data onto the auxiliary data magnetic tape.

11. The storage control method according to claim 8, further comprising reading out, at the time of receiving a request to read out the first data after completing writing the first data onto the first main data magnetic tape and the auxiliary data magnetic tape, the first data from the first main data magnetic tape and reading out, at the time of failing in reading out from the first main data magnetic tape, from the auxiliary data magnetic tape data corresponding to a location at which reading out the first data fails.

12. The storage control method according to claim 11, further comprising reading out, at the time of performing in parallel a write process for writing the second data onto the second main data magnetic tape and the auxiliary data magnetic tape and a read process for reading out the first data from the first main data magnetic tape in response to the request to read out the first data and of failing in reading out the first data from the first main data magnetic tape, from the auxiliary data magnetic tape the data, of the first data, corresponding to the location at which reading out fails, and discontinuing writing the second data onto the auxiliary data magnetic tape until completing reading out the first data from the auxiliary data magnetic tape.

13. The storage control method according to claim 12, further comprising discontinuing, at the time of failing in reading out the first data from the first main data magnetic tape, writing the second data onto the auxiliary data magnetic tape, continuing writing the second data onto the second main data magnetic tape, and reading out, after completing writing the second data onto the second main data magnetic tape and completing reading out from the auxiliary data magnetic tape the data, of the first data, corresponding to the location at which reading out fails, from the second main data magnetic tape remaining data, of the second data, which is not written onto the auxiliary data magnetic tape and adding the remaining data onto the auxiliary data magnetic tape.

\* \* \* \* \*